United States Patent
Feng et al.

(10) Patent No.: US 9,296,621 B2
(45) Date of Patent: Mar. 29, 2016

(54) DOPING AND REDUCTION OF NANOSTRUCTURES AND THIN FILMS THROUGH FLAME ANNEALING

(71) Applicant: The Board of Trustees of the Leland Stanford Junior University, Palo Alto, CA (US)

(72) Inventors: Yunzhe Feng, Redwood City, CA (US); Xiaolin Zheng, Aptos, CA (US); In Sun Cho, Aptos, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 14/229,445

(22) Filed: Mar. 28, 2014

(65) Prior Publication Data

US 2014/0294721 A1   Oct. 2, 2014

Related U.S. Application Data

(60) Provisional application No. 61/806,728, filed on Mar. 29, 2013.

(51) Int. Cl.

| | | |
|---|---|---|
| *B05D 3/08* | (2006.01) | |
| *C01G 9/02* | (2006.01) | |
| *C01G 49/06* | (2006.01) | |
| *B01J 21/06* | (2006.01) | |
| *C01G 23/053* | (2006.01) | |
| *C01G 31/00* | (2006.01) | |
| *C01G 3/02* | (2006.01) | |
| *C23C 18/12* | (2006.01) | |
| *B01J 37/16* | (2006.01) | |
| *B01J 37/34* | (2006.01) | |
| *B01J 23/06* | (2006.01) | |
| *B01J 23/22* | (2006.01) | |

(Continued)

(52) U.S. Cl.
CPC ............ *C01G 9/02* (2013.01); *B01J 21/063* (2013.01); *B01J 23/06* (2013.01); *B01J 23/22* (2013.01); *B01J 27/20* (2013.01); *B01J 27/22* (2013.01); *B01J 35/002* (2013.01); *B01J 35/004* (2013.01); *B01J 35/06* (2013.01); *B01J 37/16* (2013.01); *B01J 37/349* (2013.01); *C01G 3/02* (2013.01); *C01G 23/053* (2013.01); *C01G 31/00* (2013.01); *C01G 49/06* (2013.01); *C23C 18/125* (2013.01); *C23C 18/1216* (2013.01); *C23C 18/1229* (2013.01); *C23C 18/1245* (2013.01); *C23C 18/1254* (2013.01); *C01P 2002/54* (2013.01); *C01P 2004/03* (2013.01); *C01P 2004/04* (2013.01); *C01P 2004/16* (2013.01)

(58) Field of Classification Search
CPC .......................................................... B05D 3/08
USPC ................................................ 427/224, 223
See application file for complete search history.

(56) References Cited

PUBLICATIONS

Jang et al., Fabrication and Ultraviolet Absorption of Sol-Gel-Derived Germanium Oxide Glass Thin Films, J. Am. Ceram. Soc., 83(6) 2000, pp. 1356-1360.*

(Continued)

*Primary Examiner* — Kelly M Gambetta
(74) *Attorney, Agent, or Firm* — Foley & Lardner LLP; Cliff Z. Liu

(57) ABSTRACT

A sol-flame method includes 1) forming a sol-gel precursor solution of a source of a dopant; 2) coating a nanostructure or a thin film with the sol-gel precursor solution; and 3) subjecting the coated nanostructure or the coated thin film to flame annealing to form a doped nanostructure or a doped thin film.

16 Claims, 24 Drawing Sheets

(51) Int. Cl.
*B01J 27/20* (2006.01)
*B01J 27/22* (2006.01)
*B01J 35/00* (2006.01)
*B01J 35/06* (2006.01)

(56) References Cited

PUBLICATIONS

Bahlawane et al. New Sol-Gel Route for the Preparation of Pure a-Alumina at 950° C., J. Am. Ceram. Soc., 83(9) 2000, pp. 2324-2326.*

Feng et al. Sol-flame synthesis of hybrid metal oxide nanowires, Proceedings of the Combustion Institute, 34, 2012, published on-line Jul. 11, 2012, pp. 2179-2186.*

Feng et al. Sol-Flame Synthesis: A General Strategy to Decorate Nanowires with Metal Oxide/Noble Metal Nanoparticles, NanoLett, 13, 2013, published on-line Apr. 11, 2012, pp. 855-860.*

Tricoli et al. Micropatterning Layers by Flame Aerosol Deposition-Annealing, Adv Mater, 2008, 20, pp. 3005-3010.*

Tricoli et al. Anti-Fogging Nanofibrous $SiO_2$ and Nanostructured $SiO_2$—$TiO_2$ Films Made by Rapid Flame Deposition and In Situ Annealing, Langmuir, 2009, 25(21), pp. 12578-12584.*

Chew et al. Thin nanostructured $LiMn_2O_4$ films by flame spray deposition and in situ annealing method, J. Power Sources, 2009, 189, pp. 449-453.*

Cho et al., "Codoping Titanium Dioxide Nanowires with Tungsten and Carbon for Enhanced Photoelectrochemical Performance," Nature Communications, (2013), DOI: 10.1038/ncomms2729.

Cho et al., "Rapid and Controllable Flame Reduction of $TiO_2$ Nanowires for Enhanced Solar Water-Splitting," Nano Letters, (2014), 14, pp. 24-31.

* cited by examiner

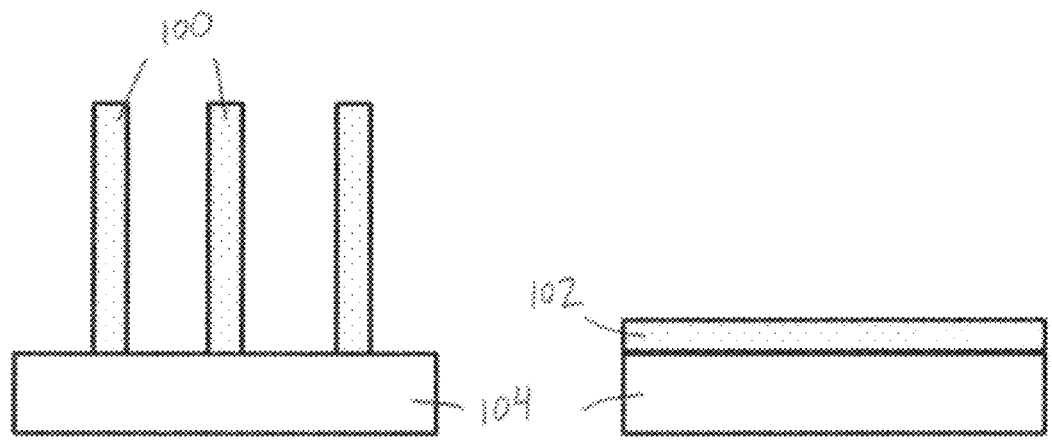
Fig. 1A
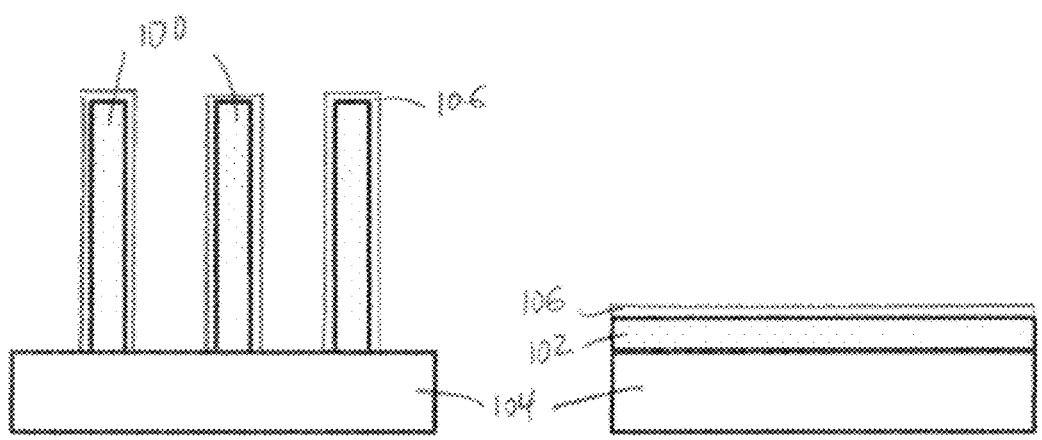
Fig. 1B

DOPING AND REDUCTION OF NANOSTRUCTURES AND THIN FILMS THROUGH FLAME ANNEALING

CROSS-REFERENCE TO RELATED APPLICATION

This application claims the benefit of U.S. Provisional Application Ser. No. 61/806,728, filed on Mar. 29, 2013, the disclosure of which is incorporated herein by reference in its entirety.

STATEMENT REGARDING FEDERALLY SPONSORED RESEARCH OR DEVELOPMENT

This invention was made with Government support under contract N00014-10-1-0291 awarded by the Office of Naval Research. The Government has certain rights in the invention.

TECHNICAL FIELD

This disclosure generally relates to nanostructures and thin films and, in some embodiments, relates to doping and reduction of nanostructures and thin films.

BACKGROUND

Metal oxides can have desirable and tunable chemical, optical and electrical properties by controlling their chemical compositions and morphologies, such as through doping or reduction to form oxygen vacancies. Such metal oxides are promising building blocks in many applications, such as catalysis, sensors, batteries, solar cells, solar fuels, and photoelectrochemical devices. However, these applications are hindered by the lack of scalable and economic methods for the synthesis of doped or reduced metal oxides.

It is against this background that a need arose to develop the embodiments described herein.

SUMMARY

One aspect of this disclosure relates to a sol-flame method. In some embodiments, the method includes 1) forming a sol-gel precursor solution of a source of a dopant; 2) coating a nanostructure or a thin film with the sol-gel precursor solution; and 3) subjecting the coated nanostructure or the coated thin film to flame annealing to form a doped nanostructure or a doped thin film.

Another aspect of this disclosure relates to a doped nanostructure or a doped thin film formed according to a sol-flame method.

Another aspect of this disclosure relates to a flame reduction method. In some embodiments, the method includes 1) providing a nanostructure or a thin film; and 2) subjecting the nanostructure or the thin film to flame annealing to introduce oxygen vacancies in the nanostructure or the thin film, where flame annealing is carried out at a temperature of at least 900° C., and a fuel-to-oxidizer equivalence ratio that is greater than 1.

Another aspect of this disclosure relates to a flame-reduced nanostructure or a flame-reduced thin film formed according to a flame reduction method.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Definitions

Figure 1D:
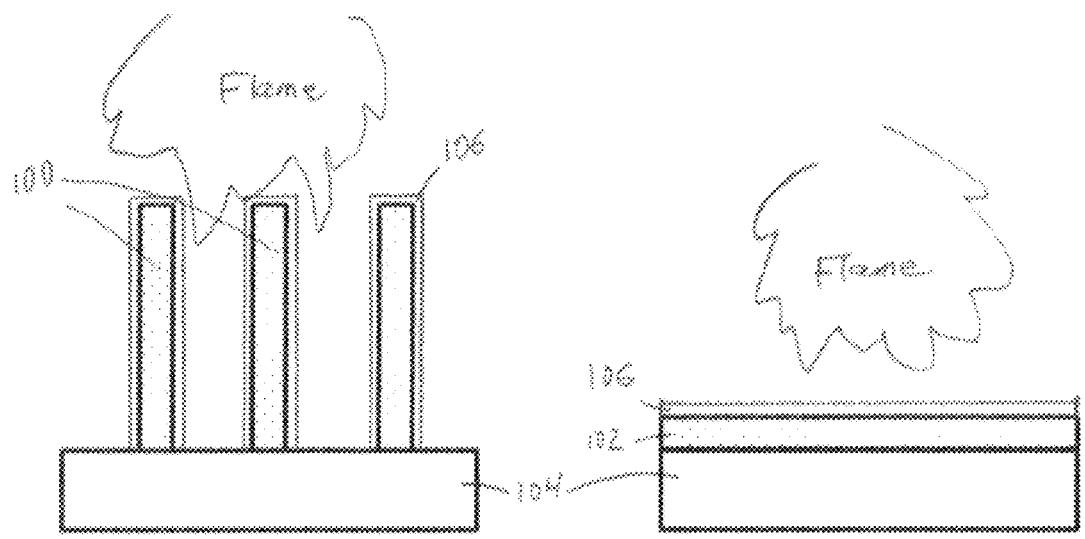
FIG. 1: Schematic operations (FIG. 1A, FIG. 1B, FIG. 1C, and FIG. 1D) of a sol-flame method.

The following definitions apply to some of the aspects described with regard to some embodiments of this disclosure. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, with respect to a numerical value, the terms can refer to less than or equal to ±10% of the value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the term "nanometer range" or "nm range" refers to a range of dimensions from about 1 nanometer (nm) to about 1 micrometer (μm). The nm range includes the "lower nm range," which refers to a range of dimensions from about 1 nm to about 10 nm, the "middle nm range," which refers to a range of dimensions from about 10 nm to about 100 nm, and the "upper nm range," which refers to a range of dimensions from about 100 nm to about 1 μm.

As used herein, the term "micrometer range" or "μm range" refers to a range of dimensions from about 1 μm to about 1 millimeter (mm). The μm range includes the "lower μm range," which refers to a range of dimensions from about 1 μm to about 10 μm, the "middle μm range," which refers to a range of dimensions from about 10 μm to about 100 μm, and the "upper μm range," which refers to a range of dimensions from about 100 μm to about 1 mm.

As used herein, the term "aspect ratio" refers to a ratio of a largest dimension or extent of an object and an average of remaining dimensions or extents of the object, where the remaining dimensions can be substantially orthogonal with respect to one another and with respect to the largest dimension. In some instances, remaining dimensions of an object can be substantially the same, and an average of the remaining dimensions can substantially correspond to either of the remaining dimensions. For example, an aspect ratio of a cylinder refers to a ratio of a length of the cylinder and a cross-sectional diameter of the cylinder. As another example, an aspect ratio of a spheroid refers to a ratio of a dimension along a major axis of the spheroid and a dimension along a minor axis of the spheroid.

As used herein, the term "nanostructure" refers to an object that has at least one dimension in the nm range. A nanostructure can have any of a wide variety of shapes, and can be formed of a wide variety of materials. Examples of nanostructures include nanowires, nanotubes, nanorods, and nanoparticles, among others.

As used herein, the term "nanowire" refers to an elongated, nanostructure that is substantially solid. Typically, a nanowire has a lateral dimension (e.g., a cross-sectional dimension in the form of a width, a diameter, or a width or diameter that represents an average across orthogonal directions) in the nm range, a longitudinal dimension (e.g., a length) in the µm range, and an aspect ratio that is greater than about 5.

As used herein, the term "nanorod" refers to an elongated, nanostructure that is substantially solid. Typically, a nanorod has a lateral dimension (e.g., a cross-sectional dimension in the form of a width, a diameter, or a width or diameter that represents an average across orthogonal directions) in the nm range, a longitudinal dimension (e.g., a length) in the nm range, and an aspect ratio that is in the range of about 3 to about 5.

As used herein, the term "nanotube" refers to an elongated, hollow, nanostructure. Typically, a nanotube has a lateral dimension (e.g., a cross-sectional dimension in the form of a width, an outer diameter, or a width or outer diameter that represents an average across orthogonal directions) in the nm range, a longitudinal dimension (e.g., a length) in the µm range, and an aspect ratio that is about 3 or greater.

As used herein, the term "nanoparticle" refers to a spheroidal or spheroidal-like nanostructure. Typically, each dimension (e.g., a cross-sectional dimension in the form of a width, a diameter, or a width or diameter that represents an average across orthogonal directions) of a nanoparticle is in the nm range, and the nanoparticle has an aspect ratio that is less than about 3, such as about 1.

Additionally, dimensions, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

Overview

By way of overview, embodiments of this disclosure provide a scalable, rapid and general ex-situ method for modifying nanostructures and thin films, such as through doping or reduction, which can avoid or reduce damage of original materials of the nanostructures and thin films, especially crystallinity and morphology, and can avoid or reduce damage of substrates supporting the nanostructures and thin films.

Figure 1D:
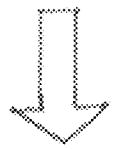
Figure 1D:
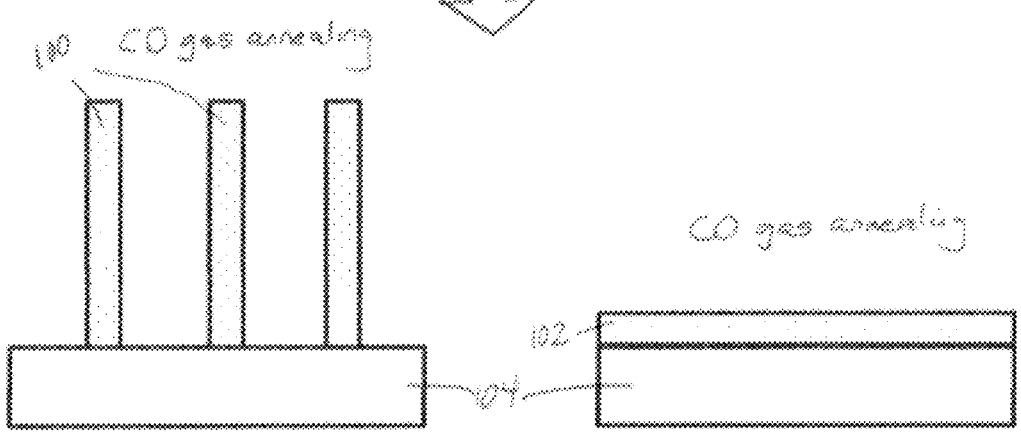

In some embodiments, a disclosed sol-flame method combines the advantages of low temperature sol-gel processing, dip-coating and high temperature flame annealing or pyrolysis and includes operations as shown in FIG. 1, specifically 1) formation of an array of nanowires 100 (or a thin film 102) on a substrate 104 and sol-gel preparation of a dopant precursor solution (FIG. 1A), 2) dip-coating to form a coating 106 of the dopant precursor solution at least partially covering the array of nanowires 100 (or the thin film 102) (FIG. 1B) and 3) rapid flame annealing to introduce the dopant into the array of nanowires 100 (or the thin film 102) (FIG. 1C).

In the first operation (FIG. 1A), the array of nanowires 100 can be grown on the substrate 104 through, for example, a thermal annealing method, a hydrothermal method, or another suitable growth method. It is also contemplated that the nanowires 100 can be separately grown and then transferred onto the substrate 104. The thin film 102 can be grown on the substrate 104 through, for example, a metal-organic decomposition method or another suitable growth method, or can be coated or deposited on the substrate 104 through a suitable coating or deposition method. A thickness of the thin film 102 can be in the nm range or the µm range. Suitable materials for nanowire arrays (or thin films) include metal oxides, such as copper oxide (e.g., CuO), zinc oxide (e.g., ZnO), aluminum oxide (e.g., $Al_2O_3$), zirconium oxide (e.g., $ZrO_2$), tungsten oxide (e.g., $W_{18}O_{49}$ and $WO_3$), iron oxide (e.g., $\alpha$-$Fe_2O_3$ and $\gamma$-$Fe_2O_3$), molybdenum oxide (e.g., $\alpha$-$MoO_3$), bismuth vanadium oxide (e.g., $BiVO_4$), titanium oxide (e.g., $TiO_2$), cobalt oxide (e.g., $Co_3O_4$), tin oxide (e.g., $SnO_2$), indium oxide (e.g., $In_2O_3$), niobium oxide (e.g., $Nb_2O_5$ and $NbO_2$), and vanadium oxide (e.g., $V_2O_5$ and $VO_2$). Other suitable materials include metalloid and nonmetal oxides (e.g., silicon dioxide (or $SiO_2$)); metal alloys; metal, metalloid and nonmetal silicides; metal, metalloid and nonmetal nitrides; metal, metalloid and nonmetal sulfides; metal, metalloid and nonmetal carbides; and various semiconductor materials. In place of, or in combination with nanowires, other nanostructures can be subjected to the sol-flame method, such as nanotubes, nanorods, and nanoparticles. Nanostructures can be in the form of an array, or individual nanostructures can be subjected to the sol-flame method.

Dopant precursor solutions, such as a dopant salt solution or a dopant-containing acid solution, can be prepared by a sol-gel method. Suitable dopants include electron donors, including metals such as tungsten (W), molybdenum (Mo), niobium (Nb), tantalum (Ta), chromium (Cr), and zirconium (Zr) and metalloids such as antimony (Sb); electron acceptors, including nonmetals such as carbon (C), nitrogen (N), sulfur (S), phosphorus (P), and fluorine (F); as well as donor-acceptor pairs such as (W, C), (Nb, C), (Ta, C), (Mo, C), (2Nb, C), (2Ta, C), (W, 2N), (Ta, N), (Nb, N), (Sb, N), (Cr, N), (Zr, S), and (Nb, P). Suitable dopant precursor solutions include those formed from salts of metals or metalloids at a concentration in the range of about 0.005 M to about 0.5 M, about 0.01 M to about 0.3 M, or about 0.01 M to about 0.2 M.

Next, in the second operation (FIG. 1B), the array of nanowires 100 (or the thin film 102) is dipped into the dopant precursor solution and withdrawn at a substantially constant speed of about 1.0 mm/s. Another withdrawal speed can be used, such as in the range of about 0.1 mm/s to about 10 mm/s, about 0.5 mm/s to about 5 mm/s, or about 0.5 mm/s to about 2 mm/s. The dip-coated array of nanowires 100 (or the dip-coated thin film 102) is subsequently dried in air or under a suitable gas flow, which evaporates most of a solvent and leaves a dopant salt (e.g., a metal salt) shell as the coating 106 on the surfaces of the nanowires 100 (or the thin film 102). Another coating method can be used in place of, or in combination with, dip-coating, such as spin-coating, spraying, printing, roll coating, curtain coating, gravure coating, slot-die, cup coating, blade coating, immersion, and pipetting. Coating of the dopant precursor solution can be carried out substantially uniformly over the surfaces of the nanowires 100 (or the thin film 102), or can be carried out in a spatially varying or patterned fashion, such as through use of a mask or a printing method.

Next, in the third operation (FIG. 1C), the dip-coated array of nanowires 100 (or the dip-coated thin film 102) is annealed in a postflame region of a premixed flame, which dissociates and oxidizes the dopant precursor, and promotes the fast diffusion of the dopant (e.g., in the form of dopant ions) into the nanowires 100 (or the thin film 102), forming the doped nanowires 100 (or the doped thin film 102).

Flame annealing can be carried out using, for example, a co-flow flat premixed flame burner operating with methane ($CH_4$) and hydrogen ($H_2$) as fuel and air ($O_2$) as oxidizer, a co-flow flat premixed flame burner operating with methane ($CH_4$) as fuel and air ($O_2$) as oxidizer, or a premixed propane torch flame. Flame annealing can be carried out in a flame at a temperature in the range of about 800° C. to about 1400° C., about 900° C. to about 1400° C., about 900° C. to about 1300° C., about 1000° C. to about 1300° C., about 1000° C. to about 1200° C., or about 900° C. to about 1,200° C., for a duration in the range of about 5 s to about 10 min, about 10 s to about 10 min, about 30 s to about 8 min, about 5 s to about 8 min, about 30 s to about 5 min, about 5 s to about 5 min, about 30 s to about 4 min, about 5 s to about 4 min, about 30 s to about 3 min, about 5 s to about 3 min, about 30 s to about 2 min, or about 5 s to about 2 min, and at a heating rate of at least about 10° C./s, at least about 50° C./s, at least about 60° C./s, at least about 70° C./s, at least about 80° C./s, at least about 90° C./s, or at least about 100° C./s, and up to about 150° C./s, up to about 200° C./s, or more. Heating of the dip-coated array of nanowires 100 (or the dip-coated thin film 102) through flame annealing can be attained primarily or substantially fully by convection as a result of direct exposure to hot combustion gases in a flame, instead of conduction.

Depending on the particular application, a fuel-to-oxidizer equivalence ratio can be 1) less than one, such as down to about 0.9, down to about 0.8, down to about 0.7, or less, which corresponds to a fuel-lean or oxidizing flame environment with a partial pressure of $O_2$ ($P_{O2}$) greater than about 0.4 Pa, such as at least about 1 Pa, at least about 10 Pa, at least about $10^2$ Pa, at least about $10^3$ Pa, at least about $10^4$ Pa, or more, 2) about one, which corresponds to a stoichiometric or neutral flame environment with a partial pressure of $O_2$ ($P_{O2}$) of about 0.4 Pa, or 3) greater than one, such as up to about 1.1, up to about 1.2, up to about 1.3, up to about 1.4, up to about 1.5, or more, which corresponds to a fuel-rich or reducing flame environment with a partial pressure of $O_2$ ($P_{O2}$) less than about 0.4 Pa, such as down to about $10^{-1}$ Pa, down to about $10^{-3}$ Pa, down to about $10^{-6}$ Pa, down to about $10^{-9}$ Pa, or less.

In the case of codoping, the doped nanowires 100 (or the doped thin film 102) is subjected to one or more additional doping operations, such as by annealing in a gaseous source of a different dopant to form the codoped nanowires 100 (or the codoped thin film 102) (FIG. 1D). For example, the doped nanowires 100 (or the doped thin film 102) can be subjected to annealing in gaseous CO at about 550° C. for about 30 min in a tube furnace in the case of C doping. It is also contemplated that codoping can be performed by repeating the coating and flame annealing operations of FIG. 1B and FIG. 1C with a sol-gel precursor solution of a different dopant. It is further contemplated that codoping can be performed using a mixed dopant precursor solution including sources of two or more different dopants. For example, for codoping (Nb, P) into $TiO_2$ nanowires (or other nanostructures or thin films), both Nb and P salts can be mixed into a solution, and a resulting mixed dopant precursor solution is coated over the $TiO_2$ nanowires, which are then subjected to flame annealing.

Figure 2A:
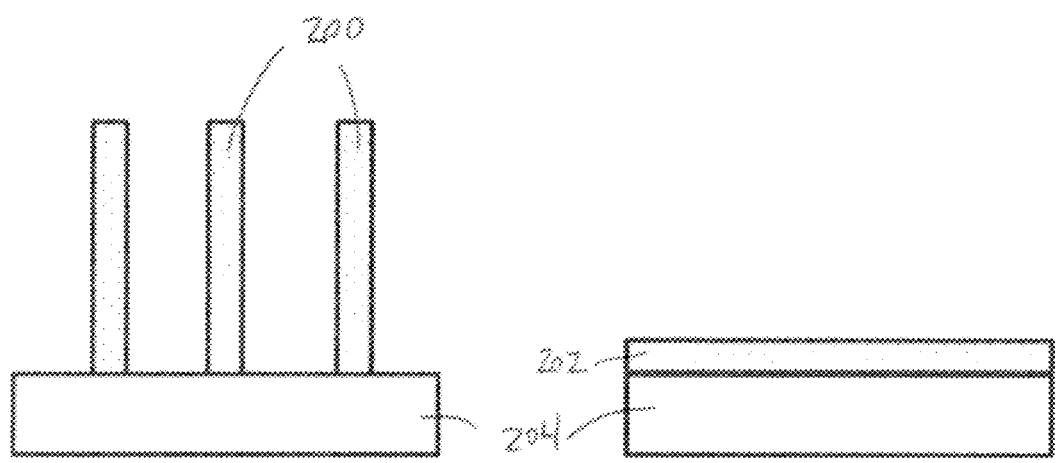
FIG. 2: Schematic operations (FIG. 2A and FIG. 2B) of a flame reduction method.
Figure 2B:
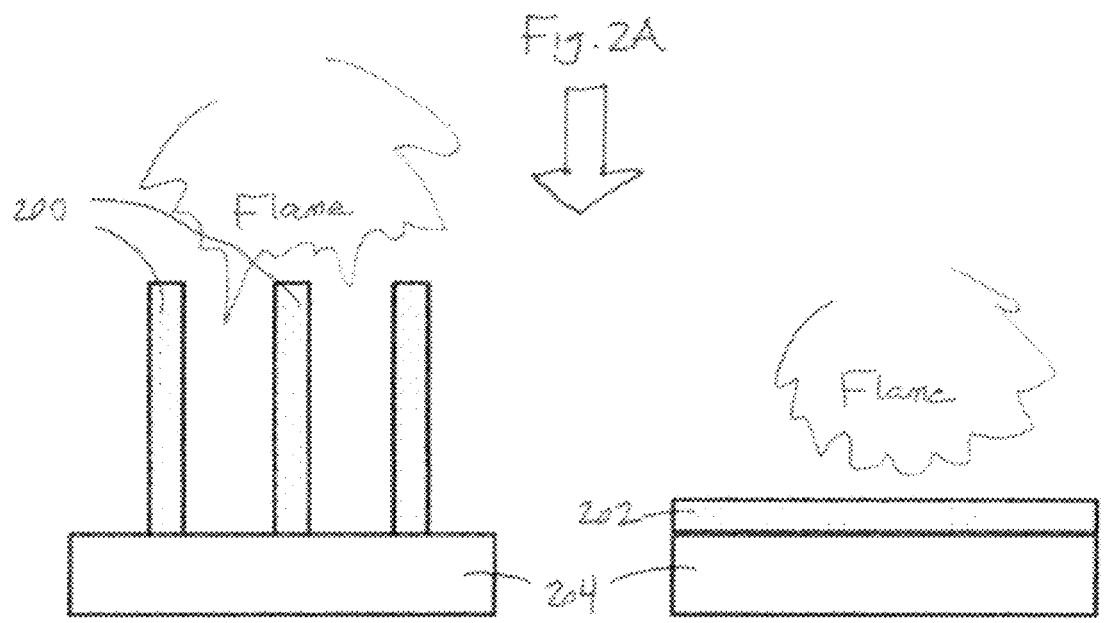

In some embodiments, a disclosed flame reduction method includes operations as shown in FIG. 2, specifically 1) formation of an array of nanowires 200 (or a thin film 202) on a substrate 204 (FIG. 2A), and 2) rapid flame annealing in a reducing environment to introduce oxygen deficiencies into the array of nanowires 200 (or the thin film 202) (FIG. 2B). Oxygen vacancies can act as electron donors, and, therefore, the introduction of oxygen vacancies can be viewed similarly as the introduction of dopants that are electron donors. Various aspects of the array of nanowires 200 (or the thin film 202) and the operations of FIG. 2 can be similarly implemented as discussed above for FIG. 1, and those aspects are not repeated.

In the case of flame reduction as shown in FIG. 2, a fuel-to-oxidizer equivalence ratio can be greater than one, such as up to about 1.1, up to about 1.2, up to about 1.3, up to about 1.4, or more, which corresponds to a fuel-rich or reducing flame environment with a partial pressure of $O_2$ ($P_{O2}$) less than about 0.4 Pa, such as down to about $10^{-1}$ Pa, down to about $10^{-3}$ Pa, down to about $10^{-6}$ Pa, down to about $10^{-9}$ Pa, or less.

Embodiments of the sol-flame and flame reduction methods can be used to dope various types of semiconducting nanostructures and thin films to modify their chemical, electrical and optical properties, such that these materials can be used in diverse application fields, such as transparent conducting oxides, photoelectrochemical water splitting devices, photocatalysis and heterogeneous catalysis, among others.

Other doping methods typically incorporate dopants during material growth (in-situ doping), which can negatively impact a crystallinity of resulting materials and change their morphology. The sol-flame and flame reduction methods, instead, introduce dopants into existing crystals, such as in the form nanostructures (ex-situ doping), so it reduces or minimizes structural disadvantages of dopants and substantially maintains an original morphology and an original crystallinity of the starting materials. In some embodiments, a morphology (e.g., in terms of a length, a diameter, or an aspect ratio of a nanostructure, or a thickness of a thin film) subsequent to the sol-flame and flame reduction methods can vary by less than or equal to ±10% of an initial or original value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In some embodiments, a crystallinity (e.g., in terms of a lattice parameter or a full width at half maximum value of a crystallographic peak in an X-ray diffraction pattern) subsequent to the sol-flame and flame reduction methods can vary by less than or equal to ±10% of an initial or original value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Also, doping of nanostructures through other methods can be expensive. In contrast, the sol-flame and flame reduction methods provide a low-cost, rapid and effective doping method. Moreover, compared to other methods, the high temperature and fast heating rate in flame annealing promotes fast diffusion of dopants and short treatment duration, and such brief exposure to a flame will induce little or no damage to delicate substrates (e.g., glass substrates). Therefore, the sol-flame and flame reduction methods are very effective to promote dopant diffusion into existing crystalline structures with little or no changes to the morphology of the original materials and with little or no damage to delicate substrates.

Additional features and advantages of the sol-flame and flame reduction methods of some embodiments include one or more of the following:

(1) The methods allow control and flexibility in terms of dose and depth profile of dopants and allows codoping or multiple-element doping, such as involving metal ions and carbon atoms directly from a flame. For example, a surface concentration of each dopant can be at least about 1 at. %, at least about 3 at. %, at least about 5 at. %, at least about 7 at. %, or at least about 10 at. %, and up to about 13 at. %, up to about 15 at. %, up to about 18 at. %, or more, a concentration of each dopant at a depth of 10 nm below the surface can be at least about 50% of the surface concentration of the dopant, such as at least about 60%, at least about 70%, at least about 80%, or at least about 90%, and up to about 95%, up to about 98%, or more, and a concentration of each dopant at a depth of 20 nm below the surface can be at least about 40% of the surface concentration of the dopant, such as at least about 50%, at least about 60%, at least about 70%, or at least about 80%, and up to about 90%, up to about 95%, or more. As another example, for the case of introducing oxygen vacancies in a metal oxide such as $TiO_2$, an oxygen-to-metal (e.g., Ti) molar ratio at the surface can be no greater than about 80% of an initial or original value in the absence of flame reduction (e.g., 2 for the case of $TiO_2$), such as no greater than about 70%, no greater than about 65%, no greater than about 60%, no greater than about 55%, or no greater than about 50%, and down to about 40%, down to about 35%, or less, and an oxygen-to-metal molar ratio at a depth of 5 nm below the surface can be no greater than about 95% of an initial or original value in the absence of flame reduction (e.g., 2 for the case of $TiO_2$), such as no greater than about 90%, no greater than about 85%, no greater than about 80%, no greater than about 75%, no greater than about 70%, or no greater than about 65%, and down to about 50%, down to about 45%, or less.

(2) The methods allow localized doping, such as through spatially selective coating of a dopant precursor solution over nanostructures or thin films.

(3) The methods allow flexibility in terms of choice of substrates, including both oxide and non-oxide substrates.

(4) The methods can result in little or no directionality in terms of doping, allowing substantially uniform doping in 1-dimensional nanostructures.

(5) The methods can result in nanostructures and thin films with improved electrical conductivity, such as having an electrical conductivity of at least about 0.05 S cm$^{-1}$, at least about 0.1 S cm$^{-1}$, at least about 0.2 S cm$^{-1}$, at least about 0.3 S cm$^{-1}$, at least about 0.4 S cm$^{-1}$, at least about 0.5 S cm$^{-1}$, at least about 1 S cm$^{-1}$, at least about 2 S cm$^{-1}$, at least about 3 S cm$^{-1}$, at least about 4 S cm$^{-1}$, at least about 5 S cm$^{-1}$, at least about 10 S cm$^{-1}$, at least about 15 S cm$^{-1}$, at least about 20 S cm$^{-1}$, or at least about 25 S cm$^{-1}$, and up to about 28 S cm$^{-1}$, up to about 30 S cm$^{-1}$, or more.

(6) The methods can be carried out under ambient or near ambient conditions, such as at or near atmospheric pressure (e.g., about 1 atm or in the range of about 0.5 atm to about 1.5 atm, about 0.8 atm to about 1.2 atm, or about 0.9 atm to about 1.1 atm).

Additional embodiments of the disclosed methods can be used to form hybrid nanostructures, such as hybrid nanowires that are coated with shells or chains of nanoparticles through dip-coating of nanowires in a nanoparticle precursor solution followed by rapid flame annealing.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

Sol-flame Synthesis of Hybrid Metal Oxide Nanowires

Overview: Hybrid metal oxide nanowires (NWs), with small characteristic diameter and large aspect ratio, can have unique and yet tunable chemical, optical and electrical properties by independently controlling chemical compositions and morphologies of individual components. Such hybrid NWs are promising building blocks in many applications, such as catalysis, sensors, batteries, solar cells and photoelectrochemical devices. However, these applications are hindered by the lack of scalable and economic methods for the synthesis of hybrid NWs. Here, this example reports a scalable sol-flame method to synthesize various hybrid metal oxide NWs, including nanoparticle-shell decorated NWs (NP-shell@NW), NP-chain decorated NW (NP-chain@NW) and doped NWs. The sol-flame method first coats existing NWs with NPs or dopants precursors prepared by the sol-gel method, and then dissociates/oxidizes these precursors in a flame. The sol-flame method combines the merits of the flame process (e.g., high temperature and fast heating rate) with low temperature sol-gel method (e.g., broad material choices and excellent chemical composition control). For both the NP-shell@NW and NP-chain@NW cases, the high temperature flame, compared to a furnace, provides much faster heating rate and shorter duration for annealing, which evaporates and burns the precursor solvent rapidly, causing NPs to quickly nucleate around NWs without significant agglomeration. Hence, a higher loading density of NPs with smaller sizes is decorated to the NWs, and the formed hybrid NP@NW exhibits significantly higher catalytic activity than that of the furnace-annealed sample. Similarly when using the sol-flame method to dope NWs, the high temperature flame allows rapid dopant diffusion and short annealing duration that maintains the morphology of the original materials and protects the delicate NW substrates from damage. It is expected that the sol-flame method can be applied to synthesize various one-dimensional hybrid metal oxide nanostructures, thereby impacting diverse application fields.

Introduction: One-dimensional (1-D) nanomaterials, such as NWs, due to their small characteristic diameter (e.g., 100 nm or less) and large aspect ratio (e.g., over 10), can have quite different electrical, optical and chemical properties than bulk materials, thin films and NPs. Moreover, hybrid or heterogeneous NWs composed of different materials and morphologies, such as axially modulated NWs, core/shell NWs, NP decorated NWs, and doped NWs, provide even more exciting opportunities to tailor their physical and chemical properties by independently controlling chemical compositions and physical morphologies of individual components. Hybrid NWs have demonstrated great potential in diverse application areas, including lithium ion batteries, gas sensors, photoelectrochemical (PEC) water splitting devices and heterogeneous catalysis. For example, Cu NWs decorated with $Fe_3O_4$ NPs can be used as a Li-ion battery anode and show six times higher energy density than $Fe_3O_4$ NPs on planar Cu because of a larger loading of $Fe_3O_4$ NPs on the Cu NWs than on the planar Cu. Fe-doped $TiO_2$ nanorods can have more than twice higher photocatalytic activity than that of $TiO_2$ powders, firstly because the 1-D nanostructure enhances charge carriers transfer, and secondly because the doped Fe decreases a band gap of $TiO_2$ and hence increases light absorption.

Developing scalable and economical synthesis methods for hybrid NWs is an indispensable step to facilitate their broad applications. Flame synthesis, in comparison to other synthesis methods (e.g., the hydrothermal method and chemical vapor deposition), provides important advantages of rapid material growth rate, low cost, versatility and scalability. Flame synthesis can be used to grow various 1-D binary metal oxide nanostructures, such as ZnO nanorods, $Fe_3O_4$ nanorods, α-$Fe_2O_3$ nanoflakes, CuO NWs, $W_{18}O_{49}$ NWs, $WO_3$ NWs and nanotubes, α-MoO$_3$ nanobelts and γ-Fe$_2$O$_3$ NWs. Flame synthesis also can be used to grow various hybrid NPs, such as Al$_2$O$_3$—TiO$_2$ mixed oxides, TiO$_2$ coated SiO$_2$, SiO$_2$ coated TiO$_2$, and YB$_2$Cu$_3$O$_x$ superconducting oxide. However, flame synthesis of 1-D hybrid nanomaterials has not been reported.

This example reports a flame synthesis strategy for the preparation of 1-D hybrid metal oxide nanomaterials by attaching NPs to or incorporating dopants into already grown NWs with a sol-flame method. The sol-flame method first coats NWs with precursors of NPs or dopants prepared by the sol-gel method, and then dissociates/oxidizes these precursors in a flame, either forming NPs on NWs or doping materials into NWs. The sol-flame method combines the merits of the sol-gel method (e.g., broad material choices and excellent chemical composition control) and the flame method (e.g., high temperature and fast heating rate). With the general sol-flame method, successive synthesis was performed for a range of NP decorated NWs (NP@NW) and doped NWs, such as TiO$_2$@CuO, ZnO@WO$_3$, Cu$_x$Co$_{3-x}$O$_4$@CuO, Au@CuO and W-doped TiO$_2$ NWs. A few example hybrid structures are discussed to illustrate the method and controlling factors for the sol-flame method.

Figure 3:
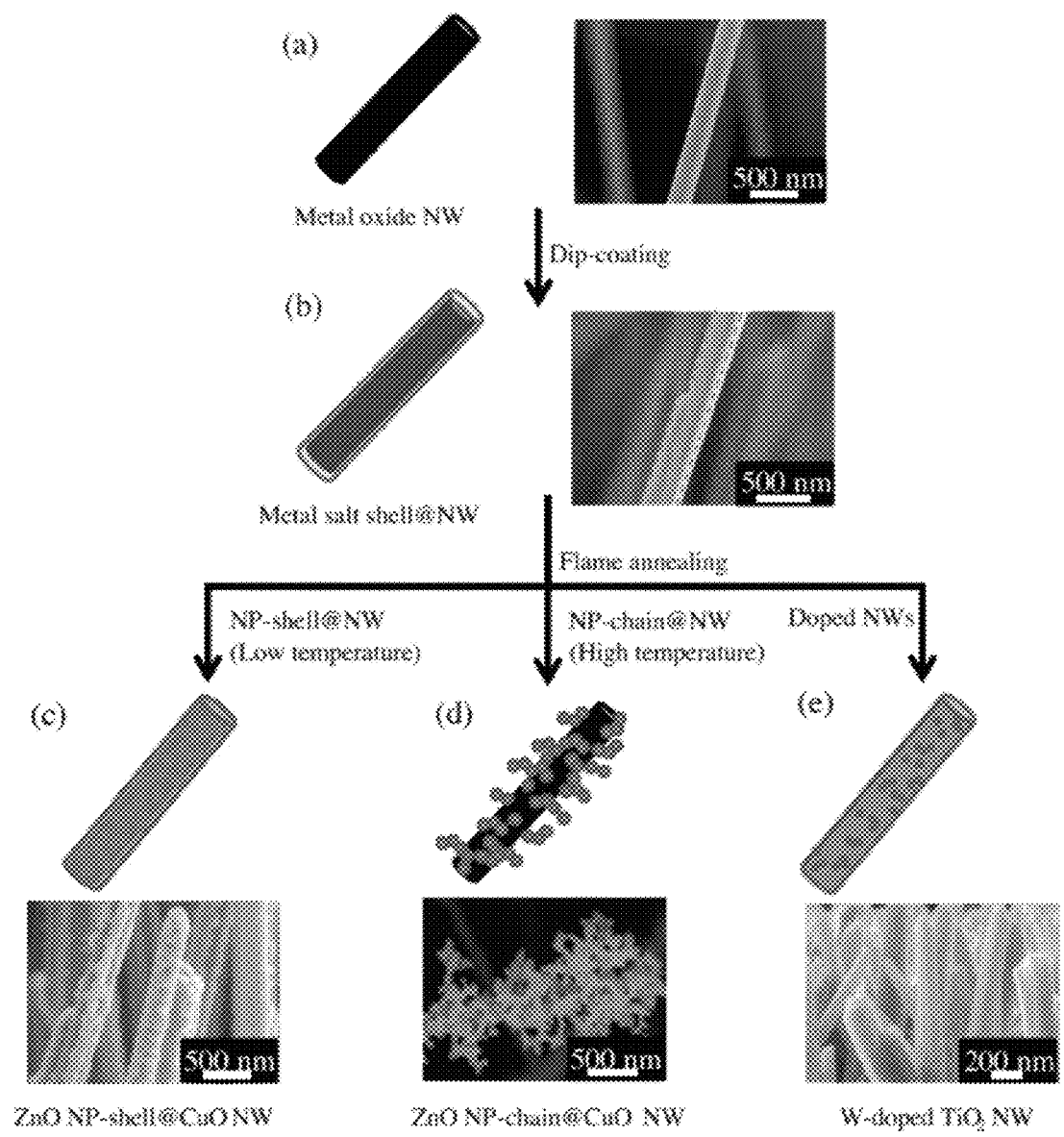
FIG. 3: Schematic operations of a sol-flame method to synthesize different hybrid metal oxide nanowires (NWs) with corresponding Scanning Electron Microscope (SEM) images.

Synthesis of hybrid metal oxide NWs: The operations of the sol-flame method for the synthesis of hybrid metal oxide NWs are illustrated schematically in FIG. 3, together with their corresponding scanning electron microscope (SEM, FEI XL30 Sirion, 5 kV) images. The sol-flame method includes three operations, namely (1) synthesis of metal oxide NW arrays and sol-gel preparation of NP precursors, (2) dip-coating and (3) rapid flame annealing. First, bare metal oxide NW arrays were grown on a substrate (FIG. 3a, Supplemental Information), and the NP precursors were prepared separately by mixing their corresponding metal salts with acetic acid and then aged for about 12 h before being used for dip coating (Supplemental Information). Next, the NW arrays were dipped into the NP precursor solution and withdrawn vertically at a substantially constant speed of about 1.0 mm/s in the ambient environment. The dip-coated NW arrays were subsequently dried in air, which evaporated most of the solvent and left a metal salt shell on the surface of the NWs (FIG. 3b). Finally, the metal salt-coated NWs were briefly annealed in the post-flame region of a premixed flame, which dissociated and oxidized the metal salt precursors, and evaporated and burned the remaining solvents.

Depending on the flame annealing condition and the material choices of NPs and NWs, three different types of hybrid metal oxide nanostructures were formed: (1) NW arrays coated with a shell of NPs (NP-shell@NW, FIG. 1c, ZnO NP-shell@CuO NWs), when the metal salt-coated NWs were annealed at low temperature, (2) NW arrays radially coated with NP chains (NP-chain@NW, FIG. 3d, ZnO NP-chains@CuO NWs), when the metal salt-coated NWs were annealed at relatively high temperature, and (3) doped NW arrays with unmodified NW morphology (FIG. 3e, W-doped TiO$_2$ NWs), when the coated metal ions can diffuse into the lattice of NWs and the annealing temperature was high. A following section includes a discussion on the effects of the flame annealing temperature, the annealing duration and the equivalence ratio on the morphologies of the final hybrid metal oxide NWs in detail.

The premixed flame used for the sol-flame method was stabilized over a co-flow flat premixed flame burner (McKenna Burner) operating with CH$_4$ and H$_2$ as fuels, and air as the oxidizer. The annealing temperature in the post-flame region was controlled by adding plain steel cooling meshes (about 0.318 cm wire spacing, about 0.064 cm wire diameter, McMaster-Carr) between the flame and the NW substrates, and was measured by a K-type thermocouple (1/16 in. bead size, Omega Engineering, Inc.). The typical flame annealing condition was at about 1100° C. (gas temperature at the substrate) for about 1 min with an equivalence ratio (Φ) of about 0.84 (the flow rates of CH$_4$, H$_2$, and air were about 2.05, about 4.64, and about 36.7 Standard Liter per Minute (SLPM), respectively), unless otherwise specified.

Measurement of the catalytic activity of hybrid metal oxide NWs: One of the major advantages of the hybrid NP@NW structure is the increased loading of active materials, which is beneficial when the NPs are involved in surface reactions. To illustrate this enhanced loading effect, measurements are made of the catalytic activities of the hybrid Co$_3$O$_4$ NPs@CuO NWs for methane (CH$_4$) oxidation reaction (Co$_3$O$_4$ is a major catalyst for CH$_4$ oxidation reaction) in a custom-built tube flow reactor. The inflow was a mixture of about 1.5 vol. % CH$_4$ and about 6 vol. % O$_2$ diluted in helium, with a total flow rate of about 100 Standard Cubic Centimeters per Minute (sccm). The CH$_4$ conversion percentage was defined as:

$$CH_4 \% = \frac{X_{CH_4} \text{ (initial)} - X_{CH_4} \text{ (effluent)}}{X_{CH_4} \text{ (initial)}},$$

where X$_{CH4}$ (initial) and X$_{CH4}$ (effluent) were the CH$_4$ mole fractions in the inflowing and effluent streams, respectively.

Results and Discussion

Synthesis and Characterization of the Hybrid NP@NW Structure

Figure 4:
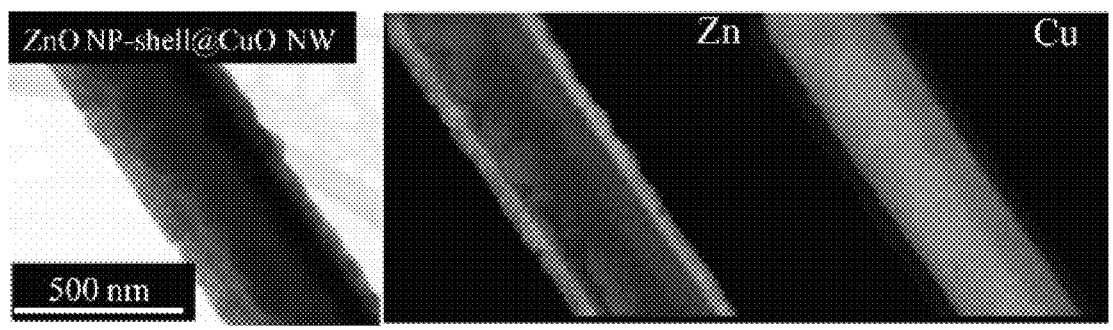
FIG. 4: Transmission Electron Microscope (TEM) image and TEM-energy dispersive X-ray spectroscopy analysis (EDS) elemental mapping of ZnO nanoparticle (NP)-shell@CuO NW synthesized by flame annealing Zn salt-coated CuO NW at about 550° C. for about 1 min.

Effects of the flame annealing temperature on the morphology of NPs: The flame annealing temperature directly affects the morphology of the NPs coated on the NW surface with the sol-flame method (FIGS. 3c and d). To demonstrate the effects of the flame annealing temperature, several CuO NW arrays are coated with a Zn salt shell at identical conditions and then annealed by flame at different temperatures. When the Zn salt-coated CuO NWs were annealed in the flame at about 550° C. for about 1 min, a substantially uniform ZnO NP shell was formed on the CuO NW surface (FIG. 3c), as shown by the transmission electron microscope (TEM, Philips CM20 FEG, 200 kV) image in FIG. 4. Moreover, the TEM energy dispersive X-ray spectroscopy analysis (EDS) elemental mapping shows that Cu is concentrated in the 200 nm core region, which is substantially the same as the diameter of the bare CuO NWs, and Zn is homogeneously distributed over the surface of CuO NW in an about 50 nm thick shell. Finally, such a hybrid ZnO NP-shell@CuO NW structure was substantially uniformly formed on the entire copper mesh substrate where the CuO NWs were grown initially (FIG. 3c).

Figure 5:
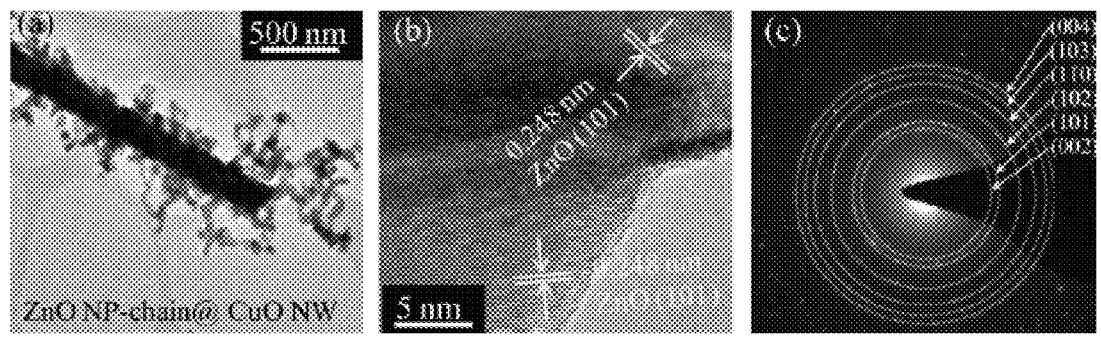
FIG. 5: (a) TEM, (b) high resolution TEM (HRTEM) and (c) selected area electron diffraction (SEAD) pattern of ZnO NP-chain@CuO NW synthesized by flame annealing Zn salt-coated CuO NW at about 1100° C. for about 1 min.

However, when the same Zn salt-coated CuO NWs were annealed in the flame at about 1100° C. for about 1 min, a different hybrid structure was obtained in which the CuO NWs were covered by ZnO NP chains fanning radially from the NW core (FIGS. 3d and 5a). Of note, these ZnO NPs (d$_{avg}$=about 70 nm) nucleated as individual NPs, forming a three-dimensional (3-D) NP-chain network, instead of agglomerating into larger particles. The high resolution TEM (HRTEM) in FIG. 5b shows that the ZnO NPs are single crystals, and the selected area electron diffraction (SAED) pattern in FIG. 5c confirms the crystallinity of the ZnO NPs. Both the size and the coverage density of the NPs can be controlled by varying the initial salt solution concentration and number of dip-coats. It should be noted that for the ZnO@CuO structure, the flame annealing temperature, as long as it is above about 600° C., has negligible effects on the size and coverage density of the coated ZnO NPs, and the final ZnO NPs form the chain morphology (FIGS. 6a and c). Since the sol-gel phase transition temperature of ZnO of about 300° C. is much lower than the observed NP-chain formation temperature, the NP-chain morphology is likely not caused by the phase change process of the sol-gel solution, but by flame, which will be discussed in detail in the following section.

Figure 6:
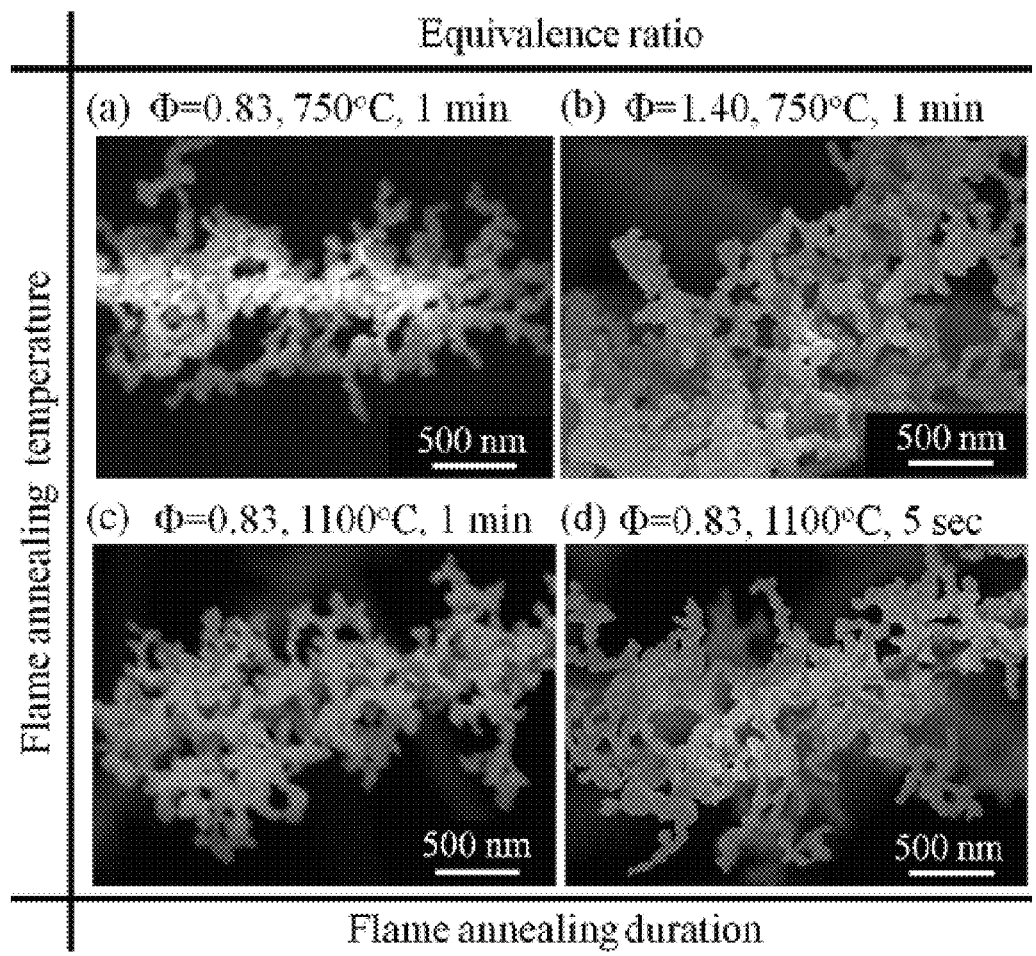
FIG. 6: SEM images of ZnO@CuO synthesized in different flame conditions which show effects of (a, c) flame annealing temperature, (c, d) flame annealing duration and (a, b) fuel to oxidizer equivalence ratio on the morphology of the NP-chain@NW structure.

Effects of flame annealing duration and equivalence ratio on the morphology of NP-chain@NW: To further investigate the effects of other flame parameters on the morphology of the hybrid NP-chain@NW structures, the same Zn salt-coated CuO NWs were annealed in the flame for different durations and different flame equivalence ratios (1). The morphologies of the final hybrid NP-chain@NW structures are compared in FIG. 6. First, the flame annealing duration has negligible effects on the morphology of the hybrid NP-chain@NW structure (FIGS. 6c and d). Even a 5 s flame annealing is sufficient to form the NP-chain structure with high crystallinity, which enables the use of temperature-sensitive delicate substrates (e.g., glass) for the growth of hybrid NWs in flame. Furthermore, the $\Phi$ ranging from about 0.83 to about 1.40 also has little effect on the size, coverage density and uniformity of the NPs (FIGS. 6a and b). Overall, the hybrid NP@NW structure is primarily sensitive to the flame annealing temperature, and not to the flame annealing duration and $\Phi$, which makes the sol-flame method easy to be implemented with great flexibility.

Figure 7:
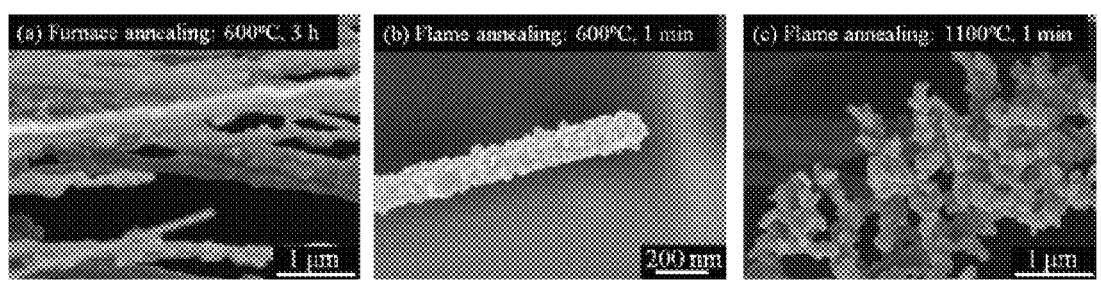
FIG. 7: Comparison of conventional furnace annealing and flame annealing effects. SEM images of $Co_3O_4$@CuO synthesized by annealing Co salt-coated CuO NWs in (a) furnace at about 600° C. for about 3 h (with a heating rate of about 5° C./min), (b) flame at about 600° C. for about 1 min, and (c) flame at about 1100° C. for about 1 min.

Comparison of flame annealing to furnace annealing: A beneficial aspect of the sol-flame method is the flame annealing operation, in comparison to furnace annealing. To explore the benefits of flame annealing, control experiments were conducted to anneal Co salt-coated CuO NWs under three different annealing conditions: (1) furnace annealing in air at about 600° C. for about 3 h (with a heating rate of about 5° C./min), (2) flame annealing at about 600° C. for 1 about min, and (3) flame annealing at about 1100° C. for about 1 min. For the furnace annealing case, large $Co_3O_4$ NPs with an average diameter of about 200 nm are sparsely dispersed on the surface of the CuO NWs (FIG. 7a). However, for the flame annealing at the same temperature, smaller $Co_3O_4$ NPs with an average diameter of about 100 nm densely cover the surface of the CuO NWs (FIG. 7b). Furthermore, for the flame annealing at much higher temperature (about 1100° C.), the NPs both have smaller average size and higher coverage density, and also form the unique NP chain structure with much higher loading of $Co_3O_4$ NPs per CuO NW. Two properties of the flame are expected to contribute to the NP morphology differences observed in FIG. 7. First, the flame annealing process has a much higher heating rate than the furnace annealing process even at the same annealing temperature, which imposes a sudden temperature rise on the metal salt coated NWs. The remaining solvent in the metal salt shell quickly evaporates and combusts, producing gases such as $H_2O$ and $CO_2$ that blow the metal salt precursors away from the NWs, and simultaneously the metal salt precursors decompose to metal or metal oxides, leading to the formation of the unique NP chain morphology. This is also related to the observed critical temperature of about 600° C. in separating two different ZnO NP morphologies (FIGS. 3c and d). Second, the high heating rate of the flame also allows shorter time for annealing, which reduces the time for the NP grain growth. Hence, smaller and less aggregated NPs are formed around the NWs for the flame annealing. In other words, one difference between flame annealing and furnace annealing is the heating rate. Although high heating rate can be achieved by other ways, such as hot air stream, flame is potentially the simplest to implement and least costly method to achieve such fast heating rates.

Figure 8:
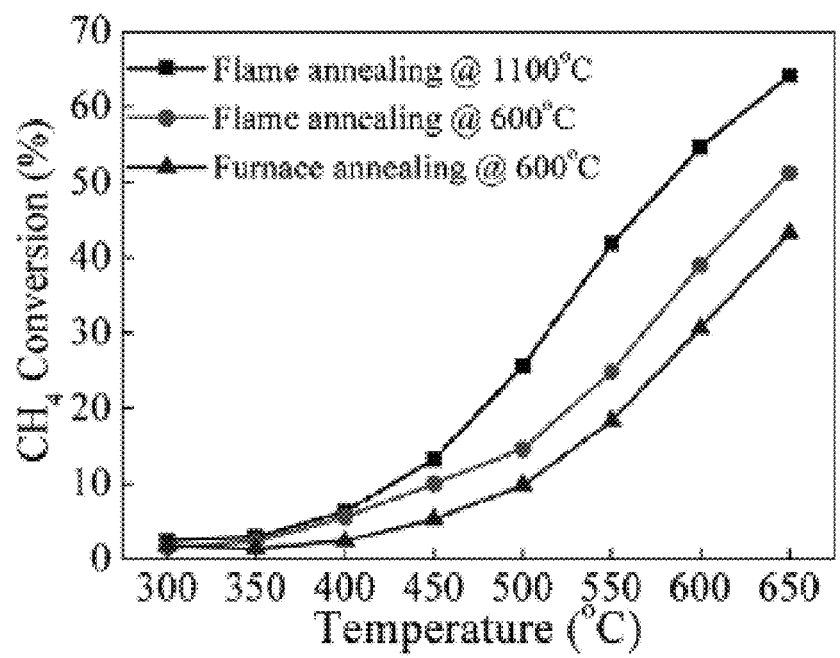
FIG. 8: Methane conversion percentages at different temperatures over $Co_3O_4$@CuO catalysts, which were synthesized by annealing Co salt-coated CuO NWs in different conditions, as shown in FIG. 5.

The merits of flame annealing become even more apparent when comparing the catalytic activities of the above three $Co_3O_4$ NPs@CuO NWs for methane oxidation since $Co_3O_4$ is a catalyst for this process. As shown in FIG. 8, the methane conversion percentages for the two flame-annealed samples, especially the 1100° C. sample, are much higher than those for the furnace-annealed sample over the entire tested temperature range. These results are consistent with the loading of catalytic $Co_3O_4$ NPs (FIG. 7), where the NP-chain morphology has the highest surface area of $Co_3O_4$ per CuO NW. This comparison illustrates the benefit of using flame annealing to achieve high surface area structures, which is important for applications such as catalysis, gas sensing and PEC water splitting.

Figure 9:
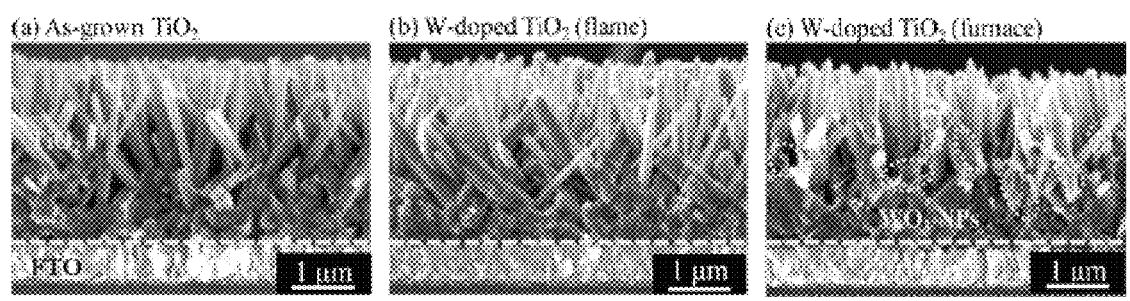
FIG. 9: SEM images of (a) as-grown $TiO_2$ NW arrays and W doped $TiO_2$ NW arrays by annealing W salt-coated $TiO_2$ NW in (b) flame at about 1100° C. for about 1 min and (c) furnace at about 550° C. for about 1 h, with the formation of $WO_3$ NPs as circled.
Figure 10:
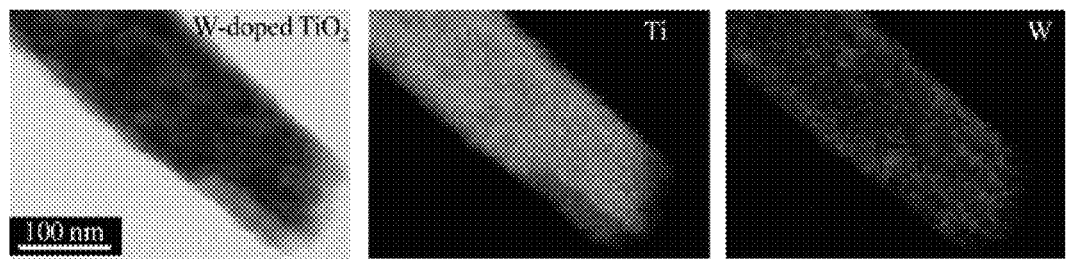
FIG. 10: TEM image and TEM-EDS elemental mapping of W doped $TiO_2$ NW synthesized by flame annealing W salt-coated $TiO_2$ NWs at about 1100° C. for about 1 min.

Synthesis and Characterization of Doped NWs: Besides coating NWs with NP shells or chains, the sol-flame method is also a powerful method to dope NWs. Incorporating dopants into materials is a way to modify their electrical and optical properties. For example, anion-doped $TiO_2$ can exhibit improved optical and electrical properties and hence enhanced performance for PEC water splitting and photocatalysis. Many doping methods, such as hydrothermal, sol-gel and impregnation, incorporate dopants during growth (in-situ doping), which can negatively impact the crystallinity of the final materials and change their morphology. The sol-flame method, instead, introduces dopants into existing NW crystals (ex-situ doping), so it minimizes or reduces the structural disadvantages of dopants and substantially maintains the original crystallinity of the starting materials. To demonstrate the doping capability of the sol-flame method (FIG. 3e), $TiO_2$ NW arrays are synthesized on fluorine-doped tin oxide (FTO) substrates by hydrothermal method (Supplemental Information), and then the FTO substrates are dip-coated with a tungsten salt solution prepared by the sol-gel method. After drying in air, the W salt-coated $TiO_2$ NWs were annealed in the flame at about 1100° C. for about 1 min. It should be noted that such brief exposure to the flame did not damage the delicate FTO substrate for which the safe temperature is ordinarily below about 550° C. For comparison, the same W-coated $TiO_2$ NWs were annealed in a tube furnace at about 550° C. for about 1 h, which is the normal temperature and duration to treat oxides grown on the FTO substrate due to the risk of damaging the FTO at higher temperature. The morphologies of the as-grown (FIG. 9a), flame-annealed (FIGS. 9b and 3e) and furnace-annealed (FIG. 9c) $TiO_2$ NW arrays are compared in FIG. 9. First, the as-grown and flame-annealed $TiO_2$ NWs have substantially identical morphology, with dense and well-aligned $TiO_2$ NWs on the FTO substrate and an average diameter of about 100 nm. Next, the doping quality of the flame-annealed $TiO_2$ was clearly shown by the TEM-EDS elemental mapping (FIG. 10), which shows that W, similar to Ti, is uniformly distributed in the entire NW. Nevertheless, for the furnace-annealed $TiO_2$ NW arrays, some $WO_3$ particles (FIG. 9c, shown in circles) are formed on the surface of $TiO_2$, since there is lack of energy for W atoms to diffuse into the $TiO_2$ at such a low temperature, so the normal furnace annealing is not effective in doping materials without damaging the substrate. These results indicate that the high temperature and short duration of flame annealing are very effective to facilitate dopant diffusion into existing crystal structures without changing the morphology of the original materials and damaging delicate substrates.

Conclusion: In summary, the sol-flame method is the demonstration of a process that bridges high temperature flame processing with low temperature sol-gel and dip-coating methods to synthesize hybrid metal oxide nanomaterials. With the sol-flame method, successful synthesis is carried out for three different types of hybrid metal oxide NWs, including NP-shell@NW, NP-chain@NW, and doped NWs. First, for both the NP-shell@NW and NP-chain@NW cases, the NP morphology is mainly determined by the flame annealing temperature and has little dependence on the flame annealing duration and equivalence ratio. When the flame annealing temperature is high enough to ignite a remaining solvent in a metal salt shell, the NP forms the chain morphology. Second, for both the NP-shell@NW and NP-chain@NW cases, compared to furnace annealing in air, the ultrafast heating rate and the high temperature of flame allow rapid solvent evaporation/combustion and nucleation of NPs in the vicinity of the NWs, leading to a higher loading density of NPs with smaller sizes, which exhibit significantly increased surface area and catalytic activity than those of the furnace-annealed samples. Finally, for doped NWs, the high temperature flame allows rapid and efficient dopant diffusion, even with a brief annealing duration that protects the original materials and substrates from damage. Given the advantages and generality of the sol-flame method, the method can be applied to synthesize various 1-D hybrid metal oxide nanostructures, and thereby impact diverse application areas.

Supplemental Information

Synthesis of Binary Metal Oxide NWs

CuO NW arrays: The CuO NWs were grown by a thermal annealing method. Typically, a piece of copper mesh (mesh density: about 100×100 inch$^{-2}$, wire diameter: about 0.0045", McMaster) with dimensions of about 1 cm×about 1 cm was annealed in air inside a tube furnace at about 520° C. for two days. Perpendicularly aligned CuO NWs with a diameter range of about 100-about 200 nm and an average length of about 50 μm were formed through a solid diffusion mechanism.

$TiO_2$ NW arrays: The $TiO_2$ NW arrays was synthesized on $TiO_2$-seeded FTO substrates using a hydrothermal method. Prior to NW growth, a $TiO_2$ polymeric sol prepared by the sol-gel method was first spin-coated on the FTO and then annealed at about 450° C. for about 1 h as the seed layer (denoted as seeded-FTO). In a typical growth process, titanium (IV) butoxide (Aldrich Chemicals, 97%) was added into about 50 ml of an aqueous HCl solution (about 25 ml of deionized (DI) water and about 25 ml of concentrated HCl (38%)) under magnetic stirring. After stirring for about 5 min, the solution was poured into a Teflon-lined stainless steel autoclave (100 ml capacity), and pieces of the seeded-FTO substrates, which have been cleaned for about 10 min using an ultrasonicator in a mixed solution of DI water, acetone, and isopropanol, were immersed in the solution. The autoclave was sealed and heated to the desired temperature (about 160-about 180° C.) in an oven, held at the temperature for about 6 h without stirring, removed from the oven, and allowed to cool down to room temperature naturally on a bench top. The obtained materials were washed with DI water followed by absolute ethanol and finally annealed at about 450° C. for about 1 h in air.

Preparation of metal salt solution and the dip-coating process: The Zn and Co metal salt precursor solutions with a typical total metal salt concentration of about 0.02-about 0.1 M, were prepared by mixing their corresponding metal salts ($Zn(CH_3COO)_2$-$2H_2O$, 99%; $Co(CH_3COO)_2$-$4H_2O$, 99%; Sigma-Aldrich Chemicals) with Acetic acid ($CH_3COOH$, 99.7%, EMD Chemicals) and then aged for about 12 h before being used for dip coating. For the preparation of W precursor doping solution (about 0.1 M), tungstic acid ($H_2WO_4$, about 0.25 g) was dissolved into $H_2O_2$ (30%, about 6 ml) and then heated to about 120-140° C. until the solution volume was reduced to about 1 ml. After cooling, about 9 ml of 2-methoxyethanol (99%, Aldrich Chemicals) was added and well mixed by stirring (about 10 min) and sonication (about 10 min). Prior to the dip coating, the metal oxide (CuO and $TiO_2$) NWs were first washed by IPA (Isopropyl alcohol) or EtOH (ethanol) to improve the coating/wetting quality of the NP precursor solution. The cleaned 1-D nanostructures were then dipped into the metal salt solution and withdrawn vertically at a substantially constant speed (about 1.0 mm/s), under ambient condition. After withdrawal, the coated 1-D nanostructures were dried in air flow.

Example 2

Codoping Titanium Dioxide Nanowires with Tungsten and Carbon for Enhanced Photoelectrochemical Performance Overview: Recent density-functional theory calculations indicate that codoping $TiO_2$ with donor-acceptor pairs is more effective than monodoping for improving photoelectrochemical water-splitting performance because codoping can reduce charge recombination, improve material quality, enhance light absorption and increase solubility limits of dopants. This example reports an ex-situ method to codope $TiO_2$ with tungsten and carbon (W, C) by sequentially annealing W precursor-coated $TiO_2$ nanowires (NWs) in flame and carbon monoxide gas. The advantages of flame annealing are that the high temperature (>1000° C.) and fast heating rate of flame allow rapid diffusion of W into $TiO_2$ without damaging the NW morphology and crystallinity. This example provides an experimental demonstration that codoped $TiO_2$:(W, C) NWs outperform monodoped $TiO_2$:W and $TiO_2$:C and double the saturation photocurrent of undoped $TiO_2$ for photoelectrochemical water splitting. Such significant performance enhancement originates from a greatly improved electrical conductivity and activity for oxygen-evolution reaction due to the synergistic effects of codoping.

Introduction: $TiO_2$ has been extensively investigated as a photoanode for photoelectrochemical (PEC) water splitting owing to its high photocatalytic activity, proper band-edge positions, superior photo-chemical stability, low-cost and non-toxicity. Much research effort has been devoted to combat the large band gap of $TiO_2$ (about 3.0-about 3.2 eV) by using cationic or anionic doping (or alloying, especially for high doping concentration). Although monodoping (single element doping) reduces the band gap of $TiO_2$ to some extent, it increases charge carrier recombination and eventually decreases the overall PEC performance. Even without doping, the performance of $TiO_2$-based PEC water-splitting cells is constrained by its rapid charge recombination due to the high trap densities in $TiO_2$. Recently, a donor-acceptor codoping concept is proposed to improve the PEC water-splitting performance of $TiO_2$ photoanode because codoping $TiO_2$ with donor-acceptor pairs can reduce charged defects and their associated recombination, improve material quality, enhance light absorption and increase solubility limits of dopants. According to density-functional theory calculations, various donor-acceptor pairs, such as (W, C), (Mo, C), (2Nb, C), (2Ta, C), (W, 2N), (Ta, N), (Nb, N), (Sb, N), (Cr, N), (Zr, S) and (Nb, P), are proposed as good candidates for $TiO_2$ codoping on the basis of the modified band gaps and band-edge positions. There is indirect experimental evidence for the effects of codoping for PEC water splitting. For example, a number of metal/anion codoping pairs are shown to improve the photocatalytic activities of $TiO_2$ for organic pollutant decomposition due to enhanced visible-light absorption and charge separation. Codoping ZnO with (Ga, N) leads to highly conductive p-type ZnO film, and improved PEC performance because of enhanced visible-light absorption and crystallinity. Codoping $LiFePO_4$ with (Si, F) shows enhanced electrical conductivity and thus leads to improved cathode rate performance for Li-ion batteries.

However, there is a lack of direct experimental demonstration on the effect of codoping $TiO_2$ for PEC application because of the lack of suitable doping methods for donor (metallic) dopants. Other methods of doping $TiO_2$ with metallic donors typically introduce the dopants during the synthesis stage of $TiO_2$ with methods such as sol-gel, hydrothermal, sputtering and solution combustion. All these in-situ doping methods can change the crystallinity/morphology compared with undoped $TiO_2$, preventing the isolation of the doping effect from crystallinity/morphology effects on the PEC performance. Here this example reports an ex-situ sol-flame doping method to dope $TiO_2$ NWs with metallic dopants (donor), and C (acceptor) is subsequently doped into $TiO_2$ by carbon monoxide (CO) annealing. The $TiO_2$:(W, C) NWs double the saturation water oxidation photocurrent of undoped $TiO_2$ for PEC water splitting and outperform the monodoped samples ($TiO_2$:W and $TiO_2$:C). Moreover, such significant PEC enhancement is because the codoping $TiO_2$ with (W, C) significantly improves the electrical conductivity of $TiO_2$ and enhances its activity for oxygen-evolution reaction (OER) as well.

Results

Figure 11:
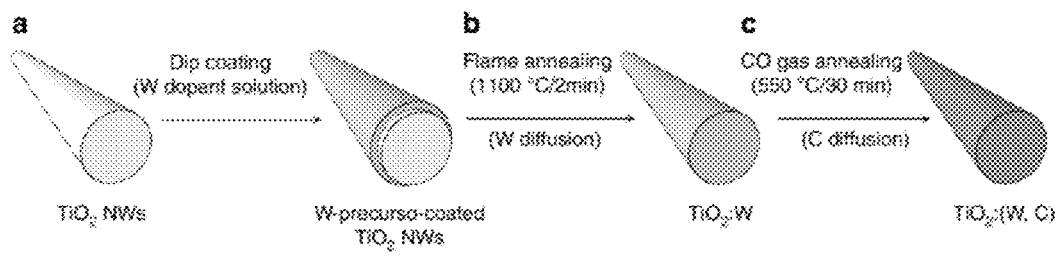
FIG. 11: Schematic illustration of an ex-situ doping method. (a) The as-synthesized $TiO_2$ NWs grown by a hydrothermal method are dip-coated with W precursor solution and then dried by air (or $N_2$) blowing. (b) The W precursor-coated NWs are annealed in a high-temperature flame (about 1100° C. for about 2 min) to allow rapid W diffusion. (c) The W-doped $TiO_2$ NWs are annealed in a tube furnace at about 550° C. for about 30 min under CO gas flow for C doping.

Ex-situ codoping of $TiO_2$ NWs: The ex-situ codoping method for $TiO_2$ NWs is illustrated in FIG. 11. First, rutile $TiO_2$ NWs with an average length of about 2.8 μm and diameter of about 100 nm are grown on fluorine-doped tin oxide (FTO) glass substrates by the hydrothermal method, and the W-dopant precursor solution is prepared separately by the sol-gel method (see Methods section). Second, the $TiO_2$ NWs are dip-coated with the W precursor solution (about 0.05 M) and then dried by air blowing, which leaves a substantially uniform thin layer of W precursor on the surface of $TiO_2$ NWs. Next, the W precursor-coated $TiO_2$ NWs are annealed in an about 1100° C. flame for about 2 min that promotes the rapid diffusion of W into $TiO_2$ NWs. Finally, the W-doped $TiO_2$ NWs are annealed in gaseous CO at about 550° C. for about 30 min in a tube furnace. As such, $TiO_2$ NWs are successfully doped with the (W, C) donor-acceptor pair.

Figure 16:
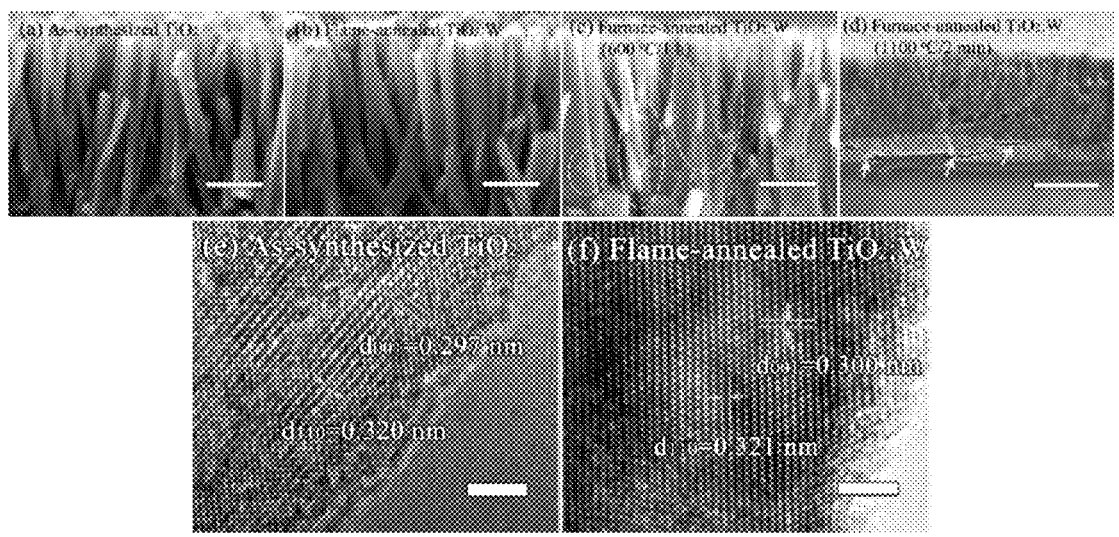
FIG. 16: Comparison of flame and furnace annealing on dopant diffusion rate and crystallinity. Cross-sectional SEM images of (a) as-synthesized (scale bar, 500 nm), (b) W-precursor coated TiO$_2$ NWs annealed in about 1100° C. flame for about 2 min (scale bar, 500 nm), (c) W precursor-coated TiO$_2$ NWs annealed in an open tube furnace at 600° C. for 1 h (scale bar, 500 nm) for which the annealing temperature and time are constrained by the damaging temperature of fluorine-doped tin oxide (FTO) substrate, and (d) W precursor-coated TiO$_2$ NWs annealed in an open tube furnace at preset 1100° C. for 2 min by quickly inserting the NWs (scale bar, 2 µm). High resolution TEM images of (e) as-synthesized and (f) W precursor-coated TiO$_2$ NWs annealed in about 1100° C. flame for about 2 min (scale bar, 2 nm).
Figure 17:
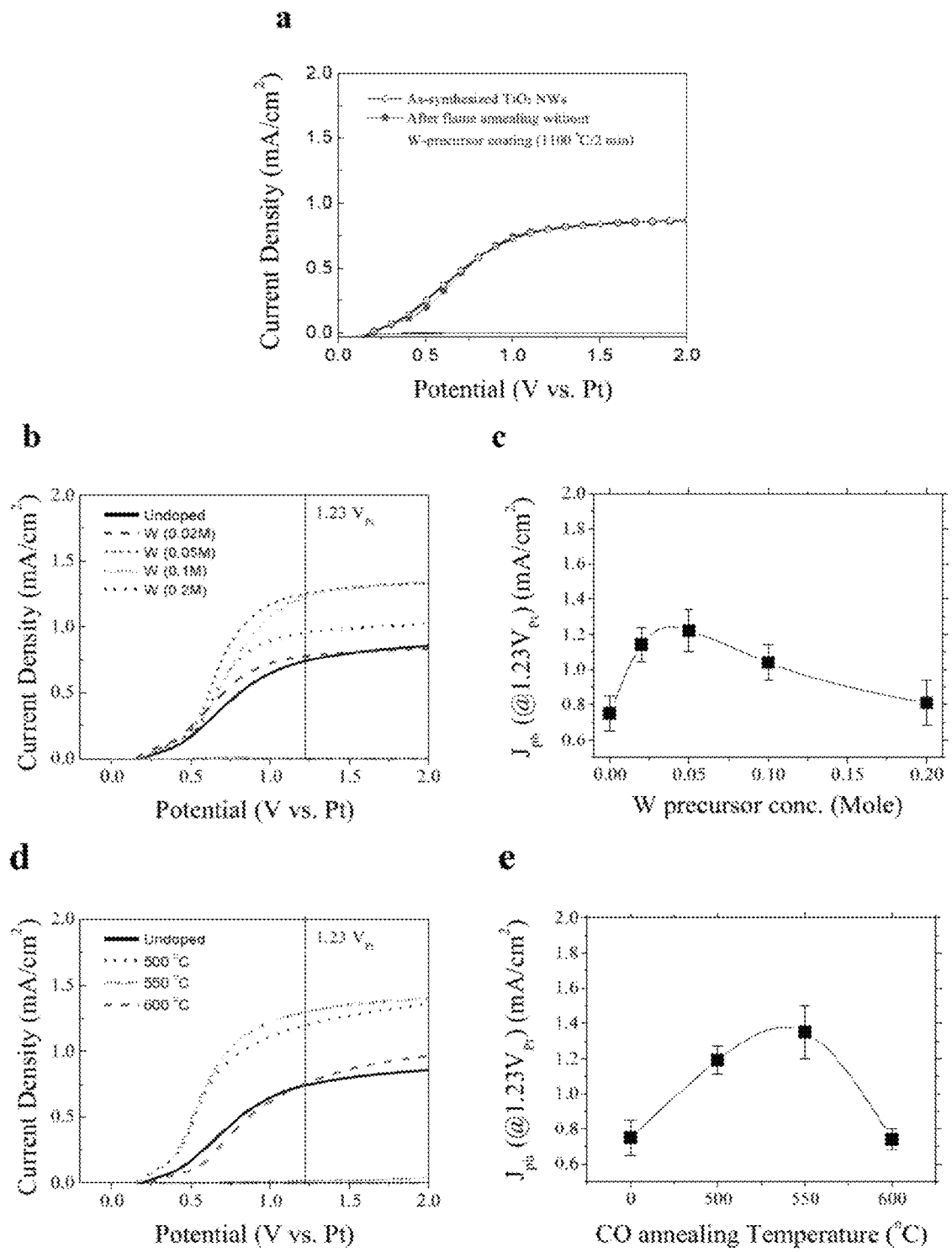
FIG. 17: Optimization of doping conditions. (a) Flame annealing alone without W precursor coating does not affect the PEC performance of undoped TiO$_2$ NWs. (b) and (c) Effect of W precursor concentration on the PEC performance of TiO$_2$:W NWs. (d) and (e) Effect of CO gas annealing temperature on the PEC performance of TiO$_2$:C NWs. The error bars represent s.d.
Figure 18:
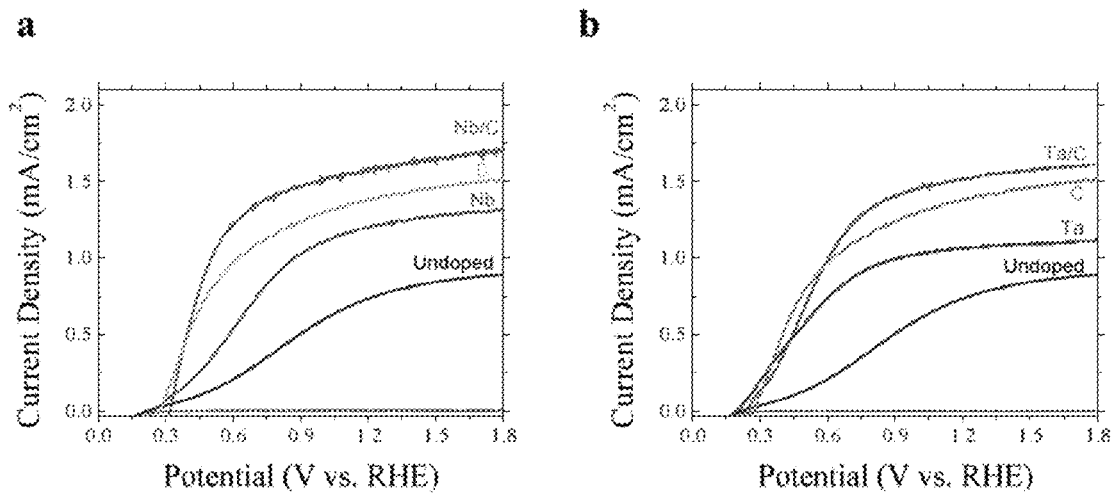
FIG. 18: J-V curves of other codoping pairs. (a) TiO$_2$:(Nb, C) and (b) TiO$_2$:(Ta, C) nanowires.

The ex-situ sequential doping method has several advantages. First, a particularly noteworthy aspect of the doping method is the combination of sol-gel process and flame annealing (named as sol-flame) for doping W. Flame provides high temperature and an ultrafast heating rate to allow rapid dopant diffusion occurring in a very short time (e.g., a couple of minutes or less). Such brief high-temperature annealing reduces or minimizes morphology and crystallinity change of $TiO_2$ NWs. The flame-annealed $TiO_2$:W NWs have substantially identical morphology (FIG. 16a,b) and crystallinity (FIG. 16e,f) with that of as-synthesized (undoped) $TiO_2$ NWs. When the W precursor-coated $TiO_2$ NWs are annealed in a conventional furnace, the slow heating rate of the furnace limits the annealing temperature to be not more than 600° C. to protect the FTO substrates. As a result, $WO_{3-x}$ particles are formed on the surface of $TiO_2$ NWs instead of diffusing into $TiO_2$ (FIG. 16c). Furthermore, even with rapid thermal annealing at 1100° C. using the furnace (that is, preheating the furnace to 1100° C. first and then quickly inserting the sample), cracks are generated in glass substrate due to thermal stress (FIG. 16d), showing the advantage of flame annealing. Second, the ex-situ doping approach, that is, incorporating dopants after NW growth, can be broadly applied to various metal-oxide NWs regardless of their synthesis methods. Third, the sequential doping method allows independent control and optimization of doping conditions for each dopant (FIG. 17). It should be noted that the doping method is applicable to other donor-acceptor pairs as well. Tests are performed on other codoping pairs, including (Nb, C) and (Ta, C), and they also exhibit improved PEC performance than the Nb, Ta or C monodoped $TiO_2$ and undoped $TiO_2$ (FIG. 18).

Figure 12:
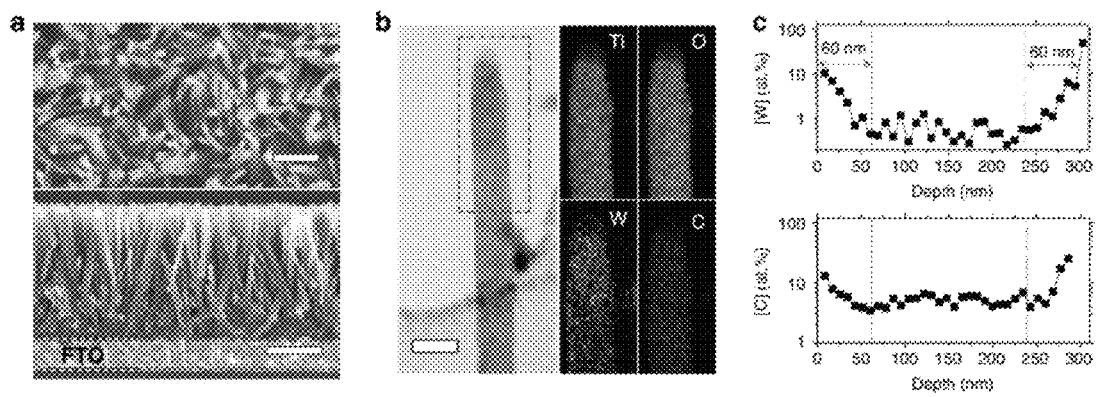
FIG. 12: Morphology and dopant-distribution characterization. (a) Top-view and cross-sectional SEM images. Scale bar, 500 nm (top view) and 1 μm (cross-sectional). (b) TEM and energy-dispersive X-ray spectrometer mapping images. Scale bar, 100 nm. (c) Secondary ion mass spectrometry (SIMS) analysis of radial depth profiles for W and C.
Figure 19:
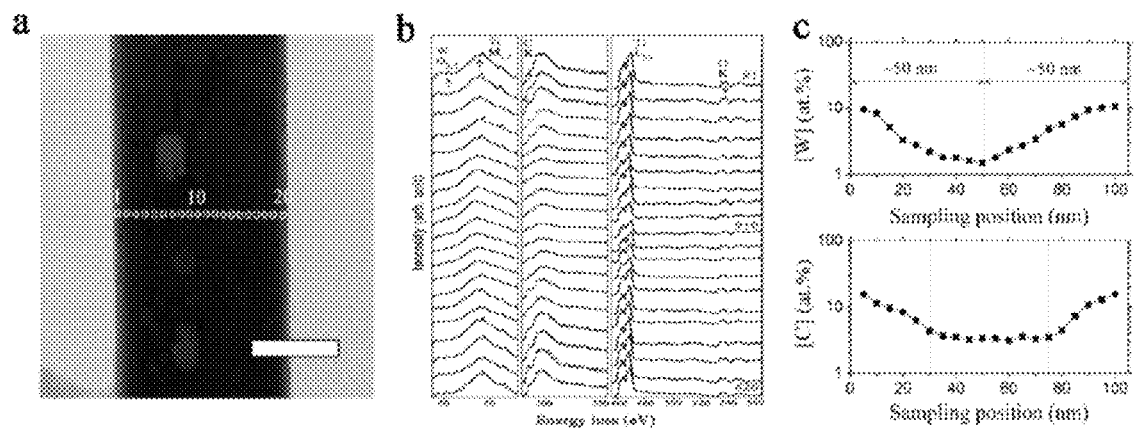
FIG. 19: Electron Energy Loss Spectroscopy (EELS) analysis. (a) TEM image of an evaluated TiO$_2$:(W, C) NW. Scale bar, 50 nm. The circles show the region where the core-loss and valence EELS spectra are acquired. (b) EELS spectra acquired from each circle shown in (a). (c) W and C concentration profiles obtained from valence and core-loss EELS spectra.

Morphology and dopants distribution: The morphology and dopant profiles of $TiO_2$:(W, C) NWs are illustrated in FIG. 12. The cross-sectional and top views (FIG. 12a) show that the $TiO_2$:(W, C) NWs have an average diameter of 100±10 nm, length of 2.8±0.1 μm and surface coverage density of about $6.3 \times 10^9$ NWs per $cm^2$. The energy-dispersive X-ray spectrometer mapping, together with transmission electron microscope (TEM) image, (FIG. 12b), shows that both W and C are doped over the entire $TiO_2$ NW. The surface concentrations of W and C dopants are estimated to be about 10.2±2.0 at. % and 13.1±3.0 at. %, respectively, via a quantitative analysis of the low loss and core-loss electron energy loss spectroscopy (EELS) spectra (FIG. 19). The W and C dopant radial depth profiles within $TiO_2$ NWs are analyzed by the secondary ion mass spectrometry (SIMS) measurements for which larger $TiO_2$:(W, C) NWs are used with an average diameter of about 300 nm for higher secondary ion yield (Methods section and FIG. 20). FIG. 12c shows the radial depth profiles of W and C dopants, which are normalized by Ti and O counts, respectively. For both W and C, their depth profiles show that the dopant concentration is high near the surface and then decreases along the radial direction towards the center. The relatively symmetric shape of W and C dopant profiles along the diameter of the NW indicates homogeneous radial diffusion of W and C. The SIMS profiles show that the radial diffusion depths for both W and C are about 60 nm, so the $TiO_2$ NWs (about 100 nm diameter) used for PEC tests are substantially fully doped with W and C dopants, which is confirmed by EELS analysis (FIG. 19).

Figure 13:
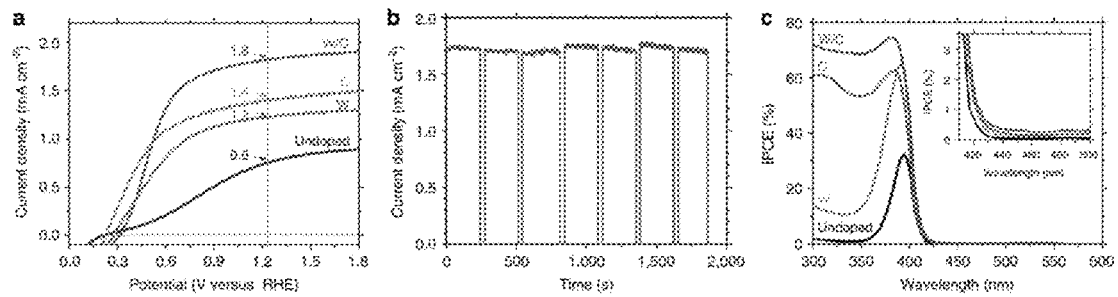
FIG. 13: Comparison of photoelectrochemical (PEC) performance. (a) Photocurrent-potential (J-V) curves of undoped, W-doped, C-doped and (W, C)-codoped $TiO_2$ NWs measured in a three-electrode setup ($TiO_2$ working, Pt-wire counter, SCE reference electrode, scan rate of 50 mVs$^{-1}$) and 1 M KOH electrolyte under simulated solar light illumination (AM 1.5 G, 100 mWcm$^{-2}$). (b) The photocurrent density-time response shows good stability of TiO$_2$:(W, C). (c) Incident photon-to-current conversion efficiency (IPCE) spectra measured at 1.23 V versus RHE. The inset shows a magnified view in the wavelength region of 400-500 nm.
Figure 21:
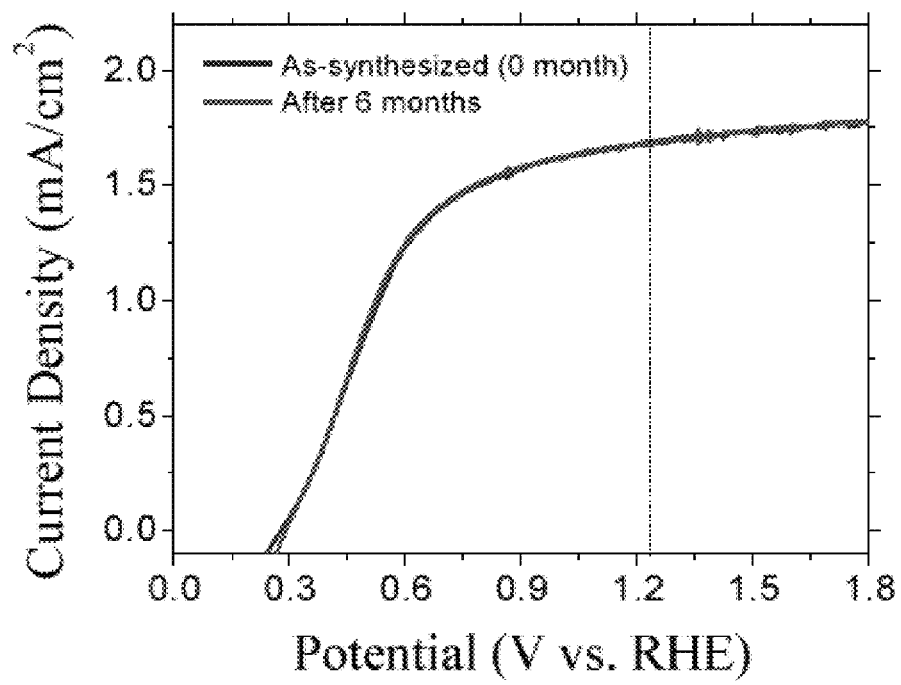
FIG. 21: Long term chemical stability. Comparison of J-V curves of TiO$_2$:(W, C) NWs after 6 months of storage in a strong base (2 M KOH) solution. It shows good chemical stability in the base electrolyte solution.

PEC water-splitting performance: The PEC water-splitting performance of the codoped $TiO_2$:(W, C) NWs is evaluated by measuring photocurrent density-potential (J-V) curves using a standard three-electrode configuration under air mass (AM) 1.5 G simulated solar light illumination (100 mW $cm^{-2}$), and compared with undoped and monodoped (W and C) $TiO_2$ NWs (FIG. 13a). The monodoped $TiO_2$ NWs are prepared by using the identical doping conditions as the $TiO_2$:(W, C) samples. First, the photocurrent density of the undoped $TiO_2$ NWs is about 0.75 mA $cm^{-2}$ at 1.23 $V_{RHE}$, which is comparable to previously reported values. Second, both monodoped $TiO_2$:W and $TiO_2$:C NWs, in comparison with the undoped $TiO_2$ NWs, show much higher photocurrent density values, that is, about 1.22 and about 1.41 mA $cm^{-2}$, respectively, at 1.23 $V_{RHE}$. More importantly, the codoped $TiO_2$:(W, C) NWs have the highest photocurrent density of about 1.81 mA $cm^{-2}$ at 1.23 $V_{RHE}$, which is about 2.4 times higher than that of undoped $TiO_2$ NWs, supporting the effectiveness of using donor-acceptor pairs to enhance PEC performance as indicated by theoretical calculations. This is an experimental demonstration for a donor-acceptor codoped $TiO_2$ system that exhibits enhanced PEC water-splitting performance than monodoped $TiO_2$. Finally, the stability of the codoped $TiO_2$:(W, C) NWs is evaluated by measuring the photocurrent-time (J-t) response (FIG. 13b). In the given 30-min experimental time interval, no noticeable degradation of the photocurrent is observed. Significantly, even after over 6 months of storage in a strong base (2 M KOH) solution, the J-V curve of the codoped $TiO_2$:(W, C) NWs remains substantially unchanged (FIG. 21), indicating the excellent chemical stability of the $TiO_2$:(W, C) NWs.

The incident photon-to-current conversion efficiencies (IPCEs), corresponding to external quantum efficiency, of four samples (undoped, W-doped, C-doped and W/C-codoped $TiO_2$ NWs) are measured at 1.23 $V_{RHE}$, where the photocurrent density values for all the samples are saturated. The IPCE values are plotted versus wavelength in FIG. 13c to compare the wavelength-dependent photocurrent response for the four $TiO_2$ NWs. First, the codoped $TiO_2$:(W, C) NWs have the highest IPCE values ($IPCE_{max}$ of about 80% at 380 nm) throughout the whole wavelength region below the band gap (about 420 nm), and then the IPCE values are lowered in the order of C-doped ($IPCE_{max}$ of about 66% at 385 nm), W-doped ($IPCE_{max}$ of about 64% at 390 nm) and undoped $TiO_2$ ($IPCE_{max}$ of about 32% at 395 nm). Second, the codoped $TiO_2$:(W, C) NWs show noticeable, though very weak, IPCE response at the visible-light region (>420 nm).

Discussion: IPCE of a PEC photoelectrode is typically determined by the efficiencies of three fundamental processes involved in PEC water-splitting reaction as illustrated in the below equation, that is, charge generation efficiency ($\eta_{e-/h+}$), charge transport efficiency within the material ($\eta_{transport}$) and charge transfer (collection) efficiency at the electrode/electrolyte interface ($\eta_{transfer}$).

$$IPCE(\lambda)=\eta_{e-/h+}(\lambda) \times \eta_{transport}(\lambda) \times \eta_{transfer}(\lambda)$$

Figure 14:
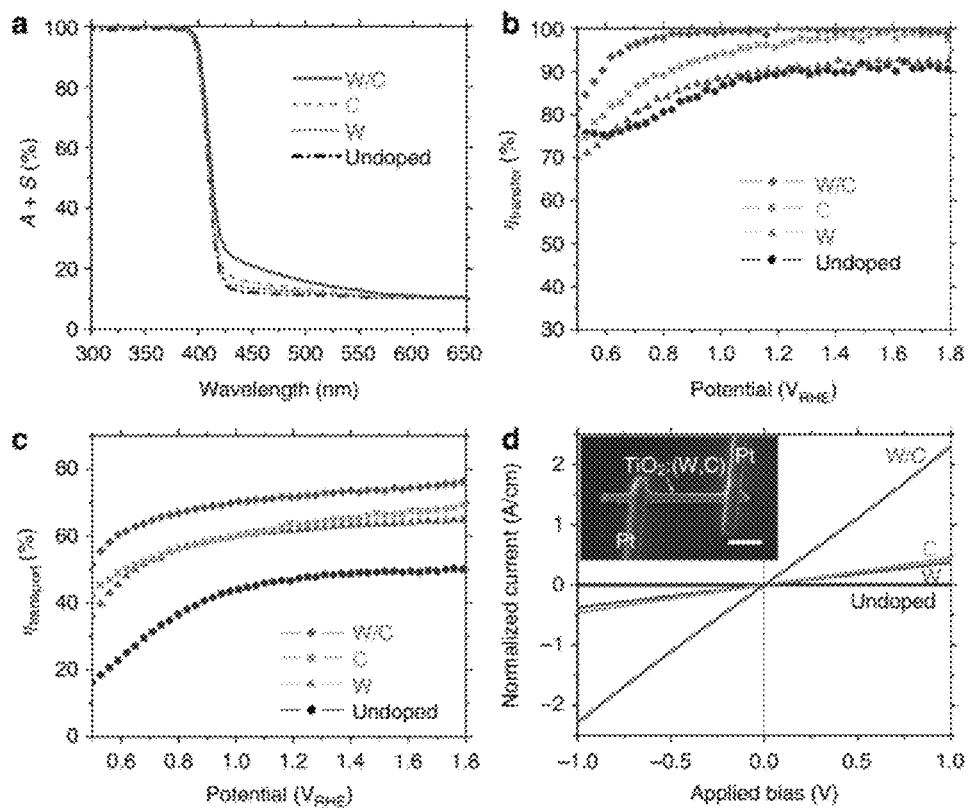
FIG. 14: Comparison of optical, charge transport and charge transfer properties. (a) Light absorption (plus scattering) of undoped, W-doped, C-doped and (W, C)-codoped TiO$_2$ NW arrays grown on quartz. The integrated light absorption (plus scattering) values calculated by integrating over the wavelength are about 59.5%, about 60.7%, about 61.1% and about 64.0% for undoped, W-doped, C-doped, and (W, C)-codoped TiO$_2$ NWs, respectively. (b) Charge transfer efficiencies. (c) Charge transport efficiencies. (d) Current-voltage curves of individual NW. The inset shows the SEM image of single TiO$_2$:(W, C) NW with metal (Pt) contacts at both ends. Scale bar, 1 µm.

To identify the main factors responsible for the high IPCE for the $TiO_2$:(W, C) NWs, the individual contributions of the above three factors are investigated separately. First, the light-absorption properties of the four $TiO_2$ samples (undoped, W-doped, C-doped and W/C-codoped) are measured (see Methods section) and compared over a wavelength range from 300 to 650 nm (FIG. 14a). FIG. 14a shows the light-absorption spectra of the four $TiO_2$ NW arrays grown on quartz substrates. Although the $TiO_2$:(W, C) NWs show slightly higher visible-light absorption tails in the wavelength region of about 420-580 nm, its integrated light absorption (about 64%) over about 300-580 nm is comparable to the other three samples, indicating that codoping within the doping conditions of this example has little impact on the light absorption or charge generation efficiency ($\eta_{e-/h+}$).

Furthermore, the charge transport efficiency ($\eta_{transport}$) and charge transfer efficiency ($\eta_{transfer}$) are decoupled and quantified by using $H_2O_2$ in a hole scavenger approach (see Methods section). The estimated charge transfer and transport efficiencies of the four $TiO_2$ samples are compared in FIG. 14b,c. For the estimated charge transfer efficiency (FIG. 14b), because the rutile $TiO_2$, especially the (110) terminated surface, has high catalytic activity towards OER, all of the four $TiO_2$ samples show relatively high charge transfer efficiencies exceeding about 70% throughout the whole potential range. Furthermore, the codoped $TiO_2$:(W, C) NWs sample has the highest charge transfer efficiency (about 99%) at 1.23 $V_{RHE}$, in comparison with the undoped (about 89%), W-doped (about 91%) and C-doped (about 96%) samples. The observed charge transfer efficiency difference indicates that the presence of donor-acceptor pair effectively reduces the surface recombination of charge carriers, especially at the low potential region (<1.0 $V_{RHE}$). The OER activity is also improved on monodoped rutile $TiO_2$ (110) surface, which is consistent with theoretical predication based on density-functional theory calculations. Monodoping also can induce high surface acidity and increase of reactant adsorption, enhancing the charge transfer process. Finally, though the codoped $TiO_2$:(W, C) NWs improve the charge transfer efficiency by about 10%, the improvement is not large enough to explain its about 2.4 times higher saturation photocurrent density value. The third factor affecting the IPCE value is the charge transport efficiency, for which both electron and hole transport can be important and are mostly affected by the bulk recombination process. As shown in FIG. 14c, the codoped $TiO_2$:(W, C) NWs sample has the highest estimated charge transport efficiency (about 50 to about 80%), on average over two times higher than that of the undoped $TiO_2$ NWs. The transport efficiency for monodoped $TiO_2$:W and $TiO_2$:C samples are in between those of the codoped and undoped samples, similar to the PEC performance shown in FIG. 13a. The electron-transport property is further compared by measuring the conductivity of individual $TiO_2$ NWs (see Methods section). FIG. 14d shows linear current-voltage (I-V) curves for four individual $TiO_2$ NWs, indicating good ohmic contact. The calculated electrical conductivity values of the undoped, W-doped, C-doped and W/C-codoped samples are about 0.0001, about 0.37, about 0.46 and about 2.26 S $cm^{-1}$, respectively. The W-doped, C-doped and W/C-codoped samples have over three orders of magnitude higher conductivity than the undoped sample, indicating that doping $TiO_2$ with either, or both, W and C significantly improves the electron-transport property. It should be noted that codoping gives higher conductivity improvement than the monodoping cases, indicating the defect passivation effect by codoping of W (donor) and C (acceptor). On the other hand, the improvement of charge transport efficiency is lower than the increase of the electrical conductivity, indicating that the bulk recombination, likely hole transport, may still represent a bottleneck for the overall charge transport process. Considering all the three factors, that is, light absorption, charge transport and transfer properties, the most pronounced effect of codoping for $TiO_2$ is to improve the charge transport property, that is, increasing electrical conductivity, and a lesser effect is to improve the surface OER activity.

Figure 15:
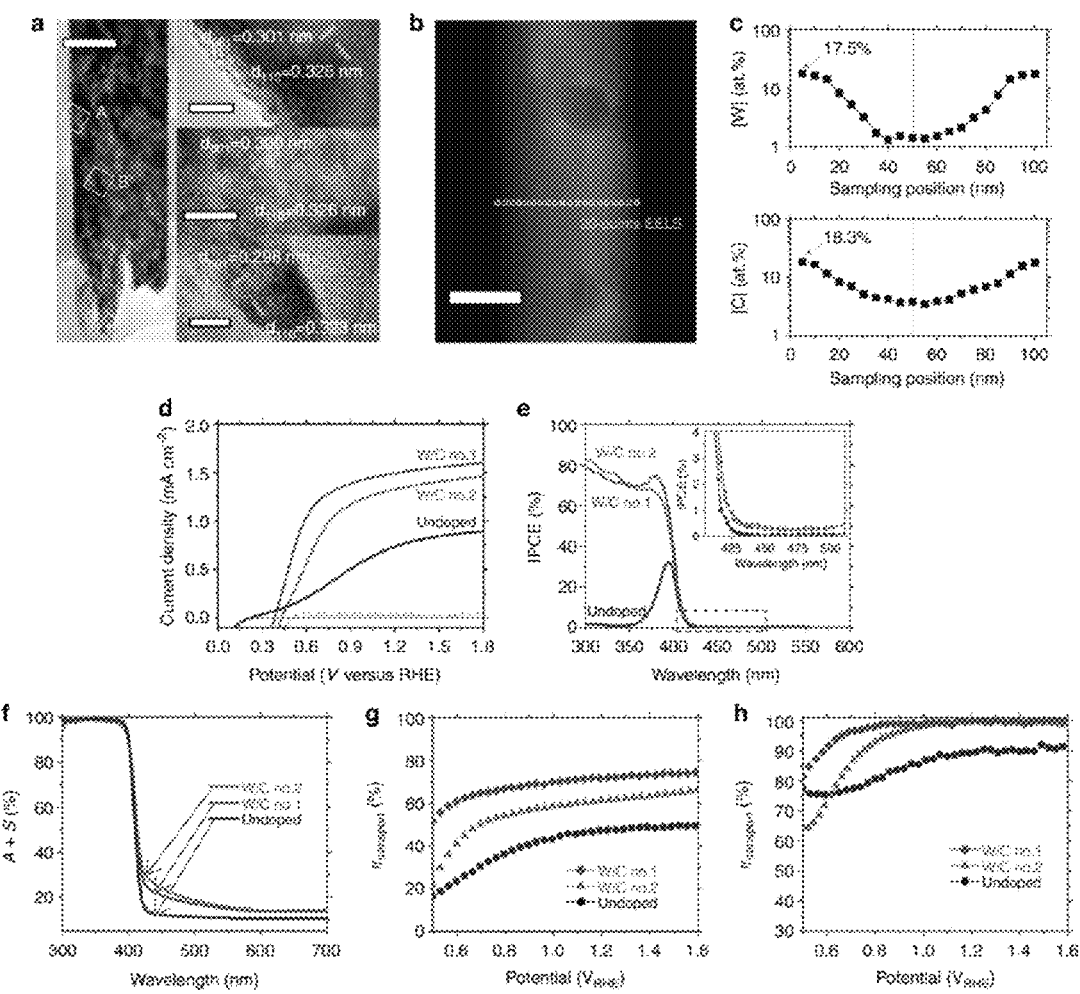
FIG. 15: Characterization and PEC water-splitting performance of TiO$_2$ NWs with high W- and C-doping concentrations. (a) TEM and high-resolution TEM images of W/C no. 2 (W: about 17.5 at. %, C: about 18.3 at. % at the NW surface). Scale bar, 50 nm (TEM) and 5 nm (high-resolution TEM). (b) Scanning TEM image. Scale bar, 50 nm. (c) Concentration profiles of W and C dopants along the NW diameter in W/C no. 2. Comparison of W/C no. 1 and W/C no. 2 with (d), three electrodes J-V curves (W/C no. 1, W: about 10.2 at. %, C: about 13.1 at. % at the NW surface), (e) IPCE, (f) light absorption (quartz substrate), (g) charge transfer efficiency and (h) charge transport efficiency. The data of undoped TiO$_2$ NWs are added for reference

Further synthesis was performed for W/C-codoped $TiO_2$ NWs with higher doping concentration (W/C no. 2) than the representative codoped $TiO_2$:(W, C) NWs (W/C no. 1, the sample discussed above) by using higher molar concentration of W precursor solution (about 0.1 M) and longer duration of CO gas annealing (about 550° C. for about 1 h). As shown in FIG. 15a-c, W/C no. 2 has much higher W (about 17.5 at. %) and C (about 18.3 at. %) surface doping concentrations than W/C no. 1 (optimal sample for PEC, W: about 10.2 at. %, C: about 13.1 at. % at the NW surface). Even though W/C no. 2 has such high W- and C-doping concentrations, there is no noticeable nanoparticle formation at the $TiO_2$ NW surface, and the high resolution TEM images at the region of A, B and C (FIG. 15a) also confirms that W/C no. 2 remains highly crystalline without dopant segregation. In comparison with W/C no. 1, W/C no. 2 exhibits inferior PEC water-splitting performance with lower saturation photocurrent density and lower IPCE values (especially near the band-edge wavelength region, about 360-400 nm) (FIG. 15d,e). Finally, both W/C no. 1 and W/C no. 2 exhibit <1% IPCE values in the visible-light wavelength region (about 420-550 nm). To identify the reasons for the lower performance of W/C no. 2, determination is made of the individual efficiencies of the three processes that govern the PEC water-splitting performance, that is, light absorption (charge generation), charge transport and charge transfer efficiency, as shown in FIG. 15f-h. First, the visible-light absorption (>420 nm) of W/C no. 2 with higher W- and C-doping concentrations is noticeably higher than that of the W/C no. 1 sample (FIG. 15f). Nevertheless, the IPCE in this visible-light region is nearly zero. Second, the charge transfer efficiency of W/C no. 2 is lower than that of W/C no. 1, especially at lower applied potential region (FIG. 15g). It is likely due to decreased OER activity by higher W and C concentration at the $TiO_2$ surface. Third, the charge transport efficiency of W/C no. 2 is consistently lower than that of W/C no. 1 over the entire applied potential range (FIG. 15h). This large decrease of charge transport efficiency in W/C no. 2 likely results from the decreased conductivity due to the enhanced dopant scattering effect at much higher doping concentration. As a result, though the $TiO_2$ NWs with higher doping concentration of W and C dopants exhibit increased visible-light absorption, their IPCE in the visible-light range is still weak (about 0.5%). In addition, the $TiO_2$ NWs with higher doping concentration of W and C dopants exhibit lower charge transport and charge transfer efficiencies, and hence lower PEC performance than those of the optimal sample.

In summary, this example reports the experimental demonstration that codoping $TiO_2$ NWs with W and C indeed greatly enhances the PEC water-splitting performance compared to the monodoped and undoped $TiO_2$ NWs. The ex-situ sol-flame doping method effectively dopes $TiO_2$ NWs with W without changing the morphology and crystallinity of $TiO_2$ NWs and without damaging the delicate FTO substrate. The codoped $TiO_2$:(W, C) NWs exhibit improved saturation photocurrent density than monodoped $TiO_2$:W and $TiO_2$:C and about 2.4 times higher saturation photocurrent density than the undoped $TiO_2$ NWs, and the enhancement is attributed to mainly charge transport efficiency improvement and to a lesser degree charge transfer efficiency improvement. The effectiveness of the doping method and codoping strategies, together with theoretical guidance, can allow further improvement of the PEC water-splitting performance of other metal-oxide photoanodes.

Methods

Synthesis of rutile $TiO_2$ NWs array: The pristine $TiO_2$ NW arrays were synthesized on $TiO_2$ nanoparticle-coated FTO substrates using the hydrothermal method. Briefly, for a typical synthesis, about 0.6 ml of titanium (IV) butoxide (Aldrich Chemicals, 97%) was added into about 50 ml of an aqueous HCl solution (about 25 ml of deionized (DI) water and about 25 ml of concentrated HCl (38%)) under magnetic stirring. For the growth of larger diameter $TiO_2$ NWs that were used for the SIMS analysis, a larger amount of Ti-butoxide (about 1 ml) was added, and the growth substrate was quartz. After stirring for another 5 min, the solution was poured into a Teflon-lined stainless steel autoclave (100 ml capacity), and pieces of the $TiO_2$ nanoparticle-coated FTO substrates, which have been cleaned for about 10 min using an ultrasonicator in a mixed solution of DI water, acetone and isopropanol (IPA), were immersed in the solution. The autoclave was sealed and heated to about 170° C. in an oven, and held at about 170° C. for about 7 h. The autoclave was then removed from the oven and allowed to cool to room temperature naturally on the bench top. The obtained products were washed with DI water and finally annealed at 450° C. for about 1 h in air.

Preparation of W-dopant precursor solution: The W-dopant precursor solutions with metal salt concentrations of about 0.01-0.2 M were prepared by using tungstic acid ($H_2WO_4$, 99%; Sigma-Aldrich Chemicals), hydrogen peroxide ($H_2O_2$, 30%; Sigma-Aldrich Chemicals) and 2-methoxyethanol ($C_3H_8O_2$, >99%; Acros Organics) with a three-stage sol-gel method: (1) dissolving the desired amount of $H_2WO_4$ into about 6-10 ml of $H_2O_2$, (2) removing excess $H_2O_2$ and water by evaporation of the solution on a hot plate (about 130° C.) until the amount of the remained solution was about 1 ml and (3) mixing the about 1 ml solution with 2-methoxyethanol by sonication (about 5 min) and stirring (about 1 h). After aging for about 6-12 h, the prepared precursor solution was used for dip-coating the as-synthesized $TiO_2$ NWs.

Doping $TiO_2$ NWs with W and/or C: (i) To dope W into $TiO_2$ NWs, the prepared W precursor solution was coated over the entire surface of $TiO_2$ NWs by the dip-coating method. After drying by air (or $N_2$) blowing and subsequent air-annealing at about 80° C. for about 10 min, the W precursor-coated $TiO_2$ NWs were annealed in a premixed flame of about 1100° C. for about 2 min with a stoichiometric fuel-to-oxidizer equivalence ratio (F) of about 1.0 (the flow rates of $CH_4$ and air were about 2.0 and about 25.5 SLPM (Standard Liters per Minute), respectively. The stoichiometric condition and usage of $CH_4$ reduces or minimizes the possibility of forming oxygen vacancy and carbon deposition on the $TiO_2$ NWs. (ii) For the C doping, the as-synthesized or W-doped $TiO_2$ NWs were annealed in a tube furnace (about 550° C. for about 30 min) with about 30 Standard Cubic Centimeters per Minute (sccm) CO gas flow. For codoping of W and C, sequential doping process of (i) and (ii) was used. The dependence of PEC performance on the doping conditions is set forth in FIG. 15.

Figure 20:
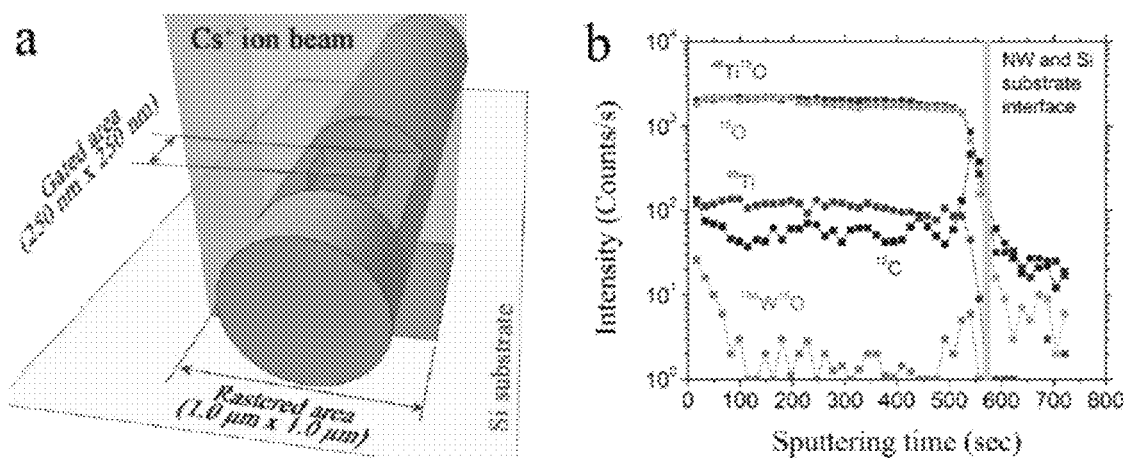
FIG. 20: SIMS analysis of W/C-codoped TiO$_2$ NWs. (a) Schematic illustration of SIMS analysis, and (b) secondary ion count rates over sputtering time.

Material characterizations and dopant depth profiles: The morphologies of undoped and doped $TiO_2$ NWs were investigated using a scanning electron microscope (SEM, FEI XL30; Sirion). The dopant distribution and surface concentration were investigated using a transmission electron microscope (TEM, F20 FEI Tecnai, 200 kV) equipped with an energy dispersive X-ray spectrometer and an EELS (FIG. 19). SIMS measurements were conducted to analyze the radial depth profiles of W and C in $TiO_2$:(W, C) NWs. To increase the secondary ion yield for SIMS measurement, larger diameter $TiO_2$ NWs (about 300 nm) were grown on quartz substrates using a larger amount of Ti-butoxide (about 1 ml) addition. After doping with W and C, the $TiO_2$:(W, C) NWs were sonicated in IPA. The NW suspension was then drop-cast onto a piece of Si (100) wafer to disperse $TiO_2$ NWs on the Si substrate. To remove the solvent residue, the NW-deposited Si substrate was washed with DI water and dried in a vacuum. The SIMS measurements were carried out using a Cameca NanoSIMS-50. A $Cs^+$ primary ion beam, accelerated at 16 keV with a 3.6 pA beam current, was used to sputter the surface of the NWs. The $^{12}C$, $^{18}O$, $^{28}Si$, $^{48}Ti$, $^{48}Ti^{16}O$ and $^{184}W^{16}O$ secondary ions and ionic fragments were collected and analyzed in a mass spectrometer. The rastered area was about 1×1 $\mu m^2$, and the gated/analysis area was the center 0.25 $\mu m^2$ area to ensure that the collected counts come from the NWs (FIG. 20). The sputtering rate was estimated by using the $TiO_2$ NW diameter and the depth profile of $^{28}Si$.

Optical measurements: As FTO and the underlying glass can contribute to background absorption in the longer wavelength regime, $TiO_2$ NWs for the optical measurements were grown on the quartz substrate instead. The wavelength-dependent optical absorption properties were obtained with an integrating sphere using a xenon lamp coupled to a monochromator (Model QEX7; PV Measurements, Inc.). The absorption plus scattering was calculated from these measurements with the formula A+S=1−T−R, where A is the absorption, S is the scattered light that was not accounted in the measurement, T is the total transmittance and R is the total reflectance.

Electronic transport properties measurement: To measure electronic transport properties of individual $TiO_2$ NWs, the NWs were sonicated in IPA and then drop-cast onto a $SiO_2$/Si substrate. Platinum (Pt) metal contacts were deposited on the both ends of each $TiO_2$ NWs by using the focused ion beam (FEI Strata DB235). Current-voltage (I-V) measurements were conducted at room temperature using a semiconductor analyzer (Model 4200-SCS; Keithley) with tungsten probes.

PEC measurements: The PEC performance of undoped and doped $TiO_2$ NWs was measured using a potentiostat (Model SP-200; BioLogic) in a three-electrode configuration (a saturated calomel reference electrode (SCE) and a Pt-wire counter electrode) under illumination of simulated solar light (AM 1.5 G, 100 mW $cm^{-2}$) using a solar simulator (Model 94306A, Class AAA; Oriel). Before the measurement, the solar simulator intensity was calibrated with a reference silicon solar cell and a readout meter for solar simulator irradiance (Mode 91150V; Newport). The illuminated area of the working $TiO_2$ electrode was about 0.63 $cm^2$ defined by a mask. A volume of 1 M KOH or 1 M KOH with 0.5 M $H_2O_2$ solution was used as the electrolyte. During the PEC measurement, the electrolyte was deaerated by Ar purging to remove the dissolved oxygen. In a typical J-V measurement, the voltage was swept linearly from −1.0 to 2.0 $V_{SCE}$ at a scan rate of about 50 mV $s^{-1}$. The IPCE was measured at 1.23 $V_{RHE}$ (=about 0.2 $V_{SCE}$) using a specially designed IPCE system for solar cell (QEX7; PV measurements), with three-electrode configuration. A 75-W Xe lamp equipped with a monochromator (CM-110, ⅛; SP Spectra Product) was used to generate a monochromatic beam. The incident light intensity was calibrated by a standard silicon photodiode. The charge transport and transfer efficiencies were estimated as functions of applied potential by using $H_2O_2$ as a hole scavenger under AM 1.5 G simulated solar light illumination. The assumption for this approach is that the oxidation kinetics of $H_2O_2$ is very fast, and its charge transfer efficiency is about 100%, so the ratio of photocurrent density measured in $H_2O$ and $H_2O_2$ gives the charge transfer efficiency for $H_2O$. The charge transport efficiency was further calculated by dividing photocurrent density in $H_2O_2$ by the total light-absorption efficiency, which is obtained from integration of light absorption (FIG. 12a) with respect to the AM 1.5 G solar light spectrum.

$$\eta_{transfer} = \frac{J_{ph,H_2O}}{J_{ph,H_2O_2}}$$

$$\eta_{transport} = \frac{J_{ph,H_2O_2}}{\eta_{e^-/h^+}}$$

Supplemental Information: The flame annealed $TiO_2$:W NWs have substantially identical morphology (FIGS. 16a and b) and crystallinity (FIGS. 16e and f) with that of as-synthesized (undoped) $TiO_2$ NWs. Comparing to the morphology of the as-synthesized $TiO_2$ NWs, low temperature furnace annealing forms $WO_3$ nanoparticles on the surface of $TiO_2$ NWs, indicating incomplete (partial) diffusion of W dopants, whereas flame annealing gives smooth surface indicating substantially complete (full) diffusion of dopants into $TiO_2$ NWs. In the case of high temperature furnace annealing with higher heating rate, it shows cracks in between FTO and glass substrate due to the thermal stress, demonstrating the advantage of flame annealing method for metal doping.

Energy dispersive X-ray mapping and EELS acquisition were performed using FEI Tecnai G2 F20 X-TWIN Transmission Electron Microscope. For the EELS spectra acquisition, a convergence semi-angle of about 9.6 mrad and collection semi-angle of about 24 were used. The spectra were acquired using a line profile feature in Tecnai imaging and Analysis (TIA) software on the sample region of interest. Spectra were collected in about 5 nm interval. The spectrum processing for elemental quantification was performed with Digital Micrograph EELS analysis. Fourier-log deconvolution process was employed to remove the plural scattering. The background of the spectra was subtracted using the power-law model. The quantification of the W dopant element in the $TiO_2$ NWs was carried out via multiple least-squares (MLS) by fitting the EELS spectra with the reference spectra of pure $TiO_2$ and W. The concentration of C dopant element was quantified from the EELS core loss region. The dopant concentrations were obtained by Hatree-Slater and Hydrogenic calculation of the ionization cross sections for Titanium-L,M edges and Carbon and Oxygen K edges, respectively. The ionization cross section for W—O edge was evaluated on a standard of tungsten(IV) oxide.

Example 3

Rapid and Controllable Flame Reduction of $TiO_2$ Nanowires for Enhanced Solar Water-splitting Overview: This example reports a flame reduction method to generate controllable amount of oxygen vacancies in $TiO_2$ nanowires that leads to nearly three times improvement in the photoelectrochemical (PEC) water-splitting performance. The flame reduction method has advantages of a high temperature (>1000° C.), ultrafast heating rate, tunable reduction environment, and open-atmosphere operation, so it allows rapid formation of oxygen vacancies (e.g., less than one minute) without damaging the nanowire morphology and crystallinity and is applicable to various metal oxides. Of note, flame reduction can greatly improve the saturation photocurrent densities of $TiO_2$ nanowires (about 2.7 times higher), α-$Fe_2O_3$ nanowires (about 9.4 times higher), ZnO nanowires (about 2.0 times higher), and $BiVO_4$ thin film (about 4.3 times higher) in comparison to untreated control samples for PEC water-splitting applications.

Introduction: Oxygen vacancy is an important defect in metal oxides, and it can directly affect the surface, electronic, magnetic, dielectric, and electrical properties of metal oxides. Oxygen vacancies are often desired for metal oxides to improve their performance for broad applications, ranging from heterogeneous catalysis, gas sensors, solid-oxide fuel-cells, electronic and electrochemical devices. For example, oxygen vacancies at the surface serve as adsorption and active sites and can strongly influence the surface reactivity, so they can enhance the performance of metal oxide based heterogeneous catalysts and gas sensors. Oxygen vacancies also act as electron donors and thereby enhance the electrical conductivity and charge transport property, which can improve the performance of field-effect transistors, supercapacitors, and Li-ion batteries. Specifically for PEC water-splitting applications, oxygen vacancies can improve both light absorption and charge transport properties of metal oxide photoanodes, leading to an enhanced PEC water-splitting performance. Due to the importance of oxygen vacancy, several reduction methods have been proposed to generate oxygen vacancies in metal oxides. One reduction method is to anneal metal oxides under carbon monoxide (CO), hydrogen ($H_2$), or inert gases at high temperature. Typically, such gas annealing is conducted either under vacuum conditions or low oxygen pressure to avoid oxygen inclusion so the annealing setup is expensive and sophisticated. Additionally, such gas annealing is carried out below 600° C. to protect the metal oxides and their carrying substrates, so a longer annealing time (>30 min) is involved to generate a sufficient amount of oxygen vacancy. Another method reduces metal oxides in aqueous solutions using chemical reducing agents (e.g., $NaBH_4$) or electrochemically by applying bias. Although solution-based reduction methods can work at atmospheric pressure, their low processing temperature (<100° C.) specifies a long reduction time (tens of minutes), and they can induce crystallinity change as well.

Here, this example reports a low cost, rapid, and effective flame reduction method to introduce controllable and tunable amount of oxygen vacancies in metal oxides by using $TiO_2$ nanowires (NWs) as a model system. Flame has the advantages of high temperature (>1000° C.) and an ultrafast heating rate, and it can introduce oxygen vacancies to metal oxides in less than one minute. Such a short treatment time also preserves the morphology and crystallinity of $TiO_2$ NWs. Significantly, flame reduction greatly improves the photocurrent density of $TiO_2$ NWs for a PEC water-splitting application, and such improvements are also observed for other flame-reduced metal oxide photoanodes.

Results and Discussion

Figure 22:
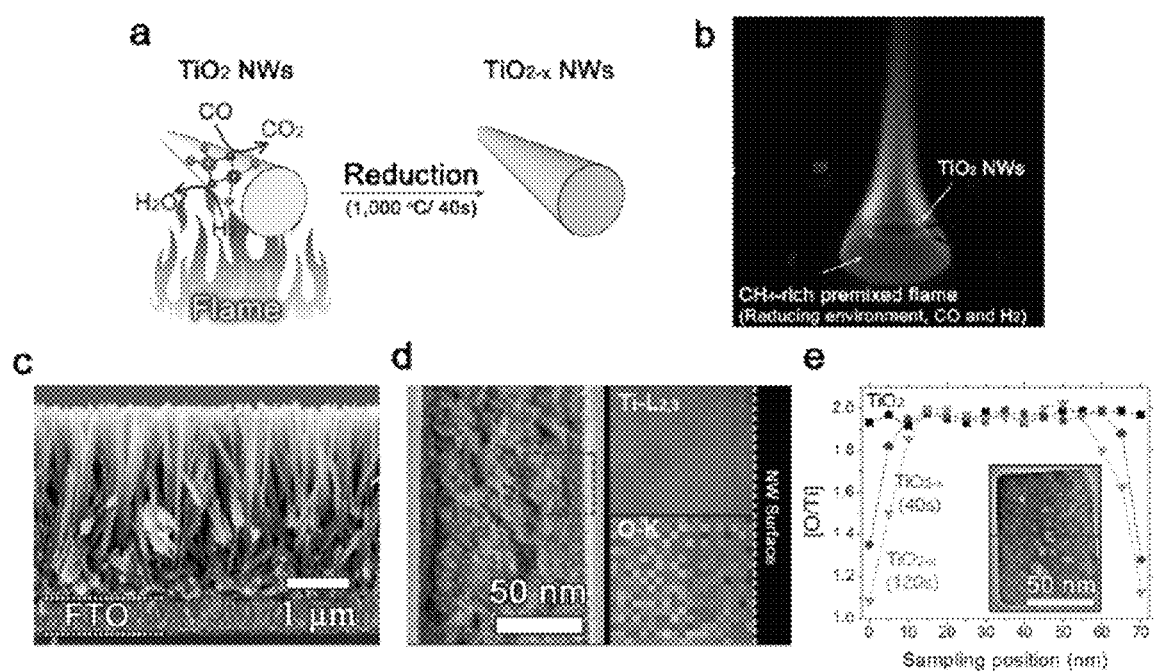
FIG. 22: Flame reduction process and characterization of oxygen vacancy distribution. (a) Schematic illustration of the flame reduction method. (b) A photograph of the flame reduction process. (c) A representative cross-sectional SEM image of the flame-reduced TiO$_2$ NWs. (d) Bright-field STEM image and the corresponding EELS elemental mapping of Ti-L$_{2,3}$ and O—K edges inside the rectangular box, showing an oxygen deficiency near the NW surface. Darker contrast: lower concentration of oxygen. (e) The O/Ti molar ratio distribution along the NW diameter (as-synthesized TiO$_2$ NW: rectangles and flame-reduced TiO$_2$ NWs: circles: about 40 s, triangles: about 120 s), which is estimated using EELS spectra taken from a cross-line shown in the inset of a cross-sectional TEM image. Flame reduction conditions: T=about 1000° C., Φ=about 1.4, and t=about 40 or about 120 s.
Figure 26:
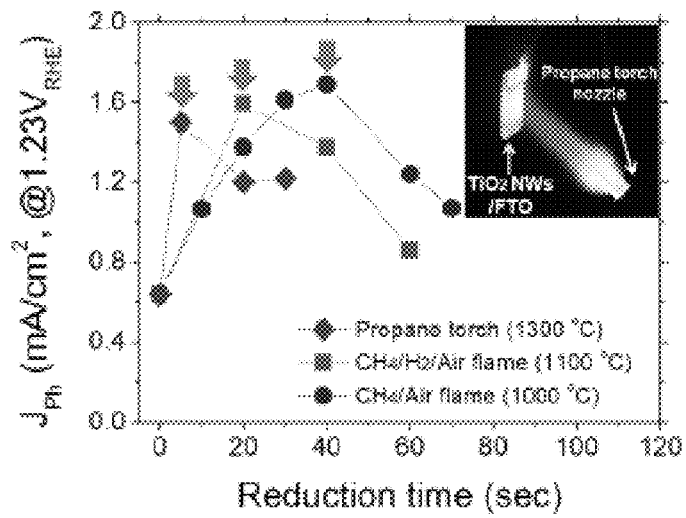
FIG. 26: Photocurrent density values versus reduction time of TiO$_2$ NWs reduced by different flame sources, showing that high temperature flame source shortens the optimal reduction time for achieving the highest $J_{ph}$. The temperature of flame is measured by inserting a K-type thermocouple into the postflame region for about 30 s. The inset photograph shows the reduction process of TiO$_2$ NWs grown on FTO substrate by a propane torch.
Figure 28:
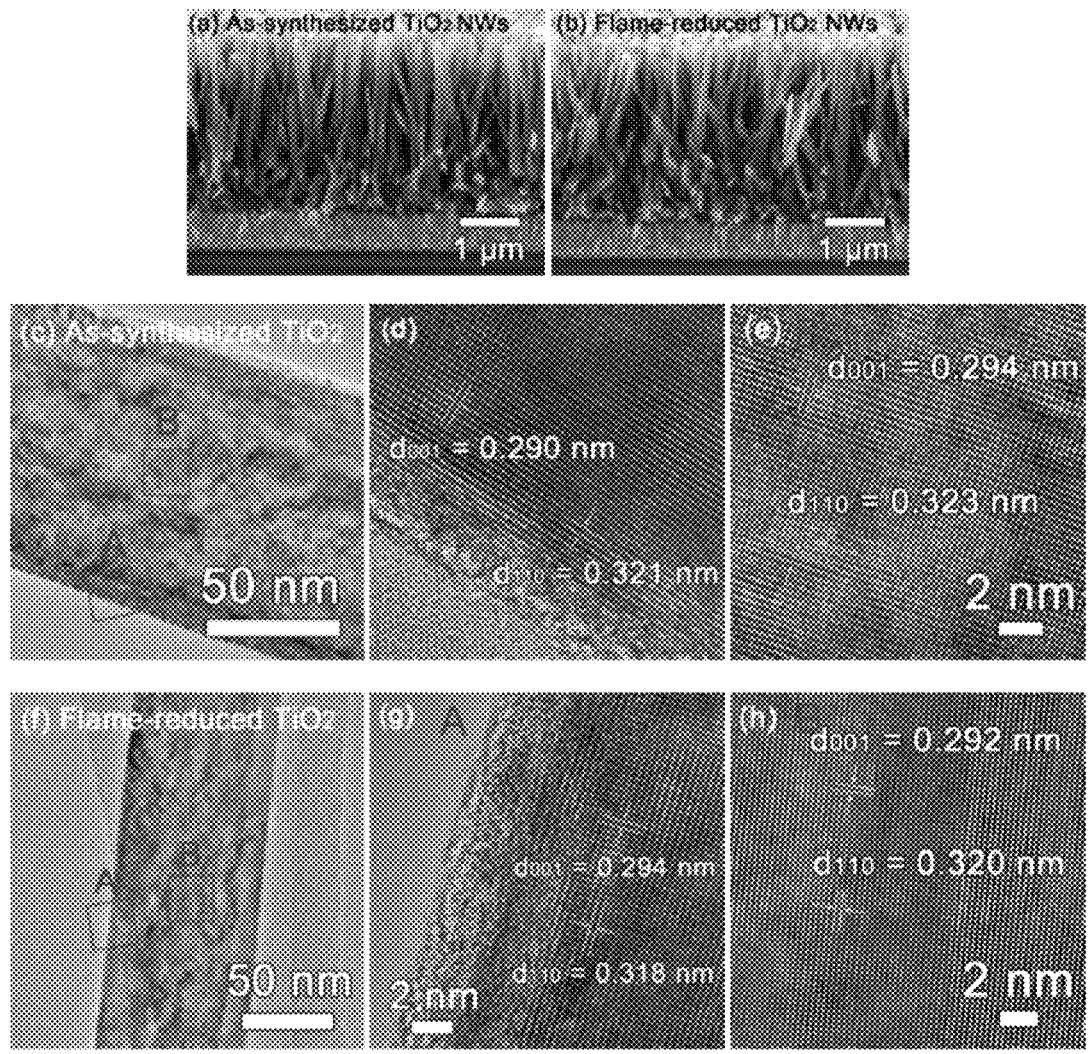
FIG. 28: Representative cross-sectional SEM images and high resolution TEM images of (a, c) as-synthesized and (b, d) flame-reduced $TiO_2$ NWs, showing that the flame reduction process does not measurably change the morphology and high crystallinity of $TiO_2$ NWs, even at the NW surface. Flame reduction conditions: T=about 1000° C., Φ=about 1.4 and t=about 40 s.
Figure 29:
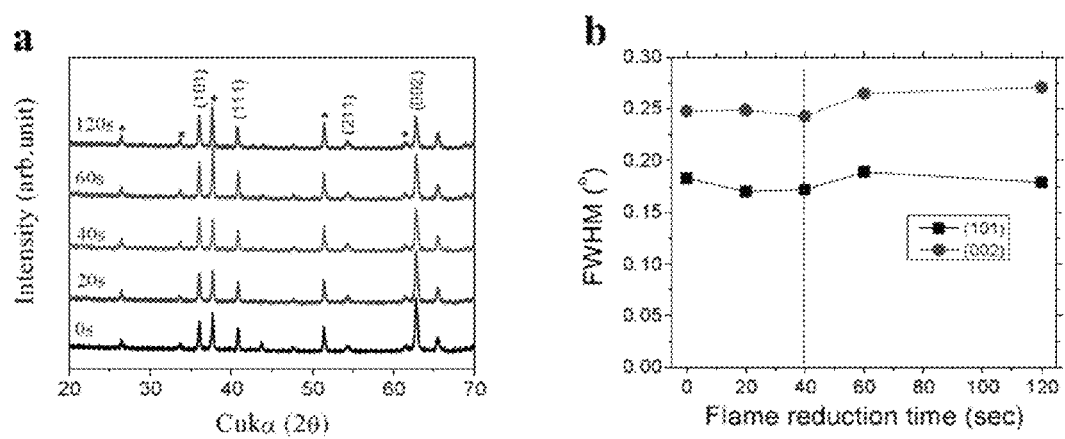
FIG. 29: (a) Representative X-ray diffraction (XRD) patterns and (b) full width at half maximum (FWHM) values of flame-reduced $TiO_2$ NWs samples. The flame-reduced $TiO_2$ NWs samples show comparable FWHM values with the untreated sample, supporting that the flame reduction process does not measurably change the crystallinity of $TiO_2$ NWs, i.e., retaining its high crystallinity. Flame reduction conditions: T=about 1000° C. and Φ=about 1.4

Flame reduction process and oxygen vacancy characterization: The flame reduction process of $TiO_2$ NWs is schematically illustrated in FIG. 22a. Rutile $TiO_2$ NWs with an average length of about 3.0 μm and diameter of about 100 nm are first grown on fluorine-doped tin oxide (FTO) glass substrates by the hydrothermal method. Then, the $TiO_2$ NWs are clamped with tweezers and quickly inserted into the post-flame region of a coflow premixed flat flame, and the $TiO_2$ NWs are annealed there with a local gas temperature of about 1000° C. for about 5 to about 120 s. The coflow premixed flame uses methane ($CH_4$) as the fuel and air as the oxidizer, and it operates at $CH_4$-rich and air-deficient conditions to provide a reducing environment that contains high concentrations of CO and $H_2$ (see the Methods section). Consequently, the $TiO_2$ NWs are reduced by the flame, forming oxygen vacancies. The flame reduction method, in comparison to other reduction methods such as $H_2$ annealing, electrochemical and metal hydride solution reductions, has several advantages. First, the high temperature and ultrafast heating rate of the flame allows the formation of oxygen vacancies in less than one minute, instead of tens of minutes or even hours as other methods. Such brief high temperature reduction reduces or minimizes the morphology and crystallinity change of $TiO_2$ NWs and mitigates against the delicate FTO/glass substrate from thermal damage. As shown in FIG. 22c and FIGS. 28-29, the flame-reduced $TiO_2$ NWs exhibit indistinguishable high crystallinity and morphology as those of as-synthesized $TiO_2$ NWs. Second, the coflow flat premixed flame configuration (FIG. 22b) provides a spatially uniform environment in terms of temperature and gas compositions so that a large size of $TiO_2$ NWs sample can be reduced uniformly. For example, the diameter of a burner used is about 6 cm, and it can reduce an about 4 cm×about 4 cm size sample substantially uniformly. Third, the flame reduction can be readily implemented and conducted in an open-atmospheric condition, so it does not require expensive vacuum systems like the $H_2$ annealing method. Even some ubiquitous flames, such as propane torch flames, can be utilized to reduce $TiO_2$ NWs (FIG. 26). Moreover, the flame reduction is carried out in the gas phase, and it reduces the possibility for impurity incorporation as encountered by the solution phase reduction. Finally, the flame reduction conditions can be conveniently tuned by changing the flame temperature and the flame fuel and air equivalence ratios, allowing the flame reduction method to be applicable to other metal oxide materials, such as α-$Fe_2O_3$, ZnO and $BiVO_4$, as well.

Figure 30:
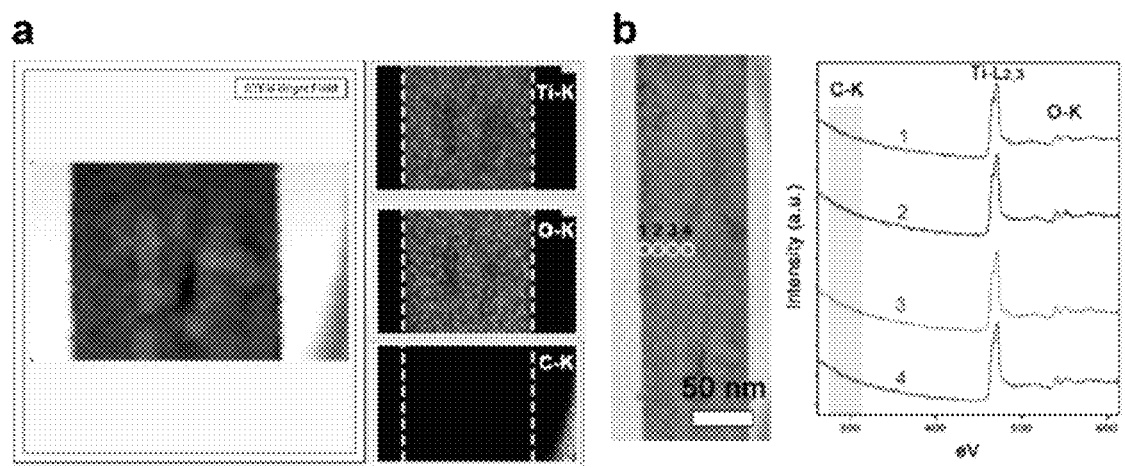
FIG. 30: TEM-EDS and EELS analysis of flame-reduced $TiO_2$ NW. (a) Bright field STEM image and the corresponding EDS mapping of Ti, O and C elements. (b) TEM image and the corresponding EELS spectra obtained at the circular points. The results show that there is no detectable amount of carbon incorporation/doping even with prolonged flame reduction. Flame reduction conditions: T=about 1000° C., Φ=about 1.4 and t=about 120 s.
Figure 31:
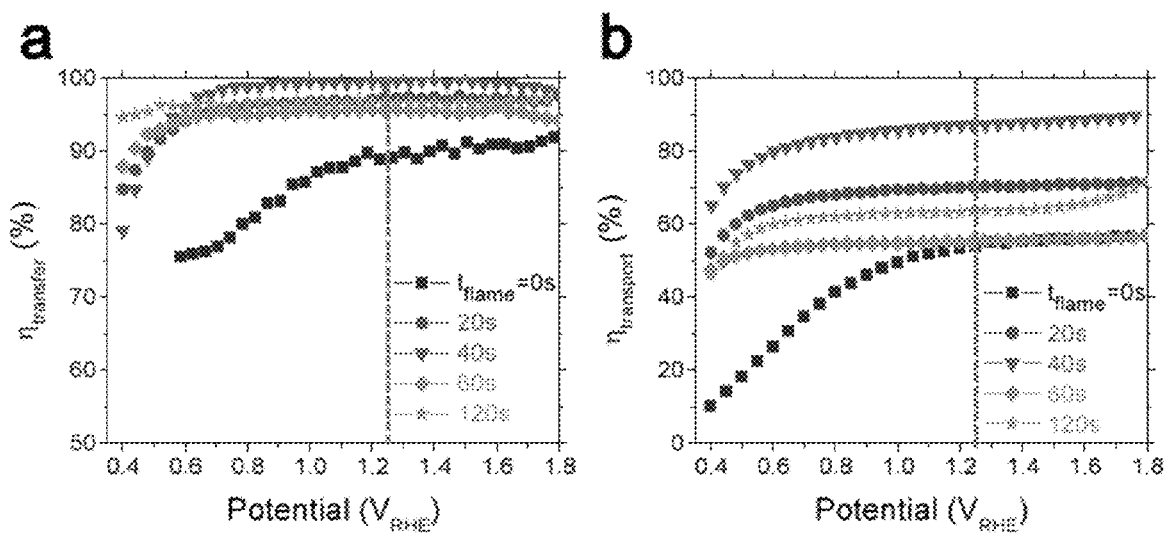
FIG. 31: Charge transport and transfer efficiencies of $TiO_2$ NWs as a function of applied potential. (a) Charge transfer efficiency. (b) Charge transport efficiency. The dotted line indicates an applied potential of 1.23 $V_{RHE}$. Flame reduction conditions: T=about 1000° C. and Φ=about 1.4

The formation and distribution of oxygen vacancies in the flame-reduced $TiO_2$ NWs are analyzed by the electron energy loss spectroscopy (EELS) technique (see the Methods section). As shown in FIG. 22d, the EELS elemental mapping of Ti and O at the rectangular region shows that oxygen is deficient near the surface of the flame-reduced $TiO_2$ NW. The 0/Ti molar ratios are further quantitatively examined in cross sections of $TiO_2$ NWs (FIG. 22e). The 0/Ti molar ratio is about 2 for the as-synthesized $TiO_2$ NW as expected, but it decreases below 2 in the outer 10-15 nm layer of the flame-reduced $TiO_2$ NW and drops to about 1.3 and about 1.1 at the surface for about 40 s and about 120 s reduction, respectively. The EELS results show that oxygen vacancies are successfully generated inside $TiO_2$ NWs by flame reduction. In addition, transmission electron microscope-energy dispersive spectroscopy (TEM-EDS) and EELS analysis (Supporting Information, FIG. 30) do not show a detectable amount of carbon even for prolonged flame reduction of about 120 s, so it indicates that the flame reduction mainly generates oxygen vacancies in the $TiO_2$ NWs with a negligible amount of carbon impurity incorporation if there is any. The reason for the low carbon incorporation is that $CH_4$ does not contain C—C bonds and does not tend to form soot. It should be noted that the flame reduction method is different with other flame treatments used to improve the PEC performance of $TiO_2$. Other flames used are typically Bunsen burners using high sooting-tendency propane and butane as fuels, and they mainly introduce carbon doping and also change the phase and crystallinity of $TiO_2$. The flame reduction of this example is controlled to generate oxygen vacancy, not carbon doping, while substantially maintaining the phase and crystallinity of $TiO_2$. In addition, the flat premixed flame provides spatially uniform temperature and gas phase compositions in contrast to the highly non-uniform Bunsen burner flames. Hence, the flame reduction method allows focusing on the effects of oxygen vacancy on the PEC performance of $TiO_2$.

Optimization of Flame Reduction Conditions for PEC Water-Splitting Performance: To optimize the flame reduction conditions of $TiO_2$ NWs, the flame annealing parameters are varied, including the flame fuel-to-air equivalence ratio (Φ) and the flame annealing time, and the properties of $TiO_2$ NWs are evaluated by applying them as photoanodes for PEC watersplitting. The PEC water-splitting performance of flame-reduced $TiO_2$ NWs is determined by measuring the photocurrent-potential (J-V) curves using a standard three-electrode configuration under AM1.5 G simulated solar light illumination (100 mW/cm$^2$) (see the Methods section) and compared with those of the as-synthesized (untreated) $TiO_2$ NWs.

(1) Effect of the Flame Fuel-to-Air Equivalence Ratio (Φ). First, the flame fuel-to-air equivalence ratio (Φ) is specified as the actual fuel/oxygen mass ratio normalized by the stoichiometric fuel/oxygen mass ratio (see equation below). Experimentally, the flame equivalence ratio is controlled by adjusting the flow rates of $CH_4$ and air (see the Methods section).

$$\Phi = \frac{m_{CH_4}/m_{O_3}}{(m_{CH_4}/m_{O_2})_{st}}$$

Figure 23:
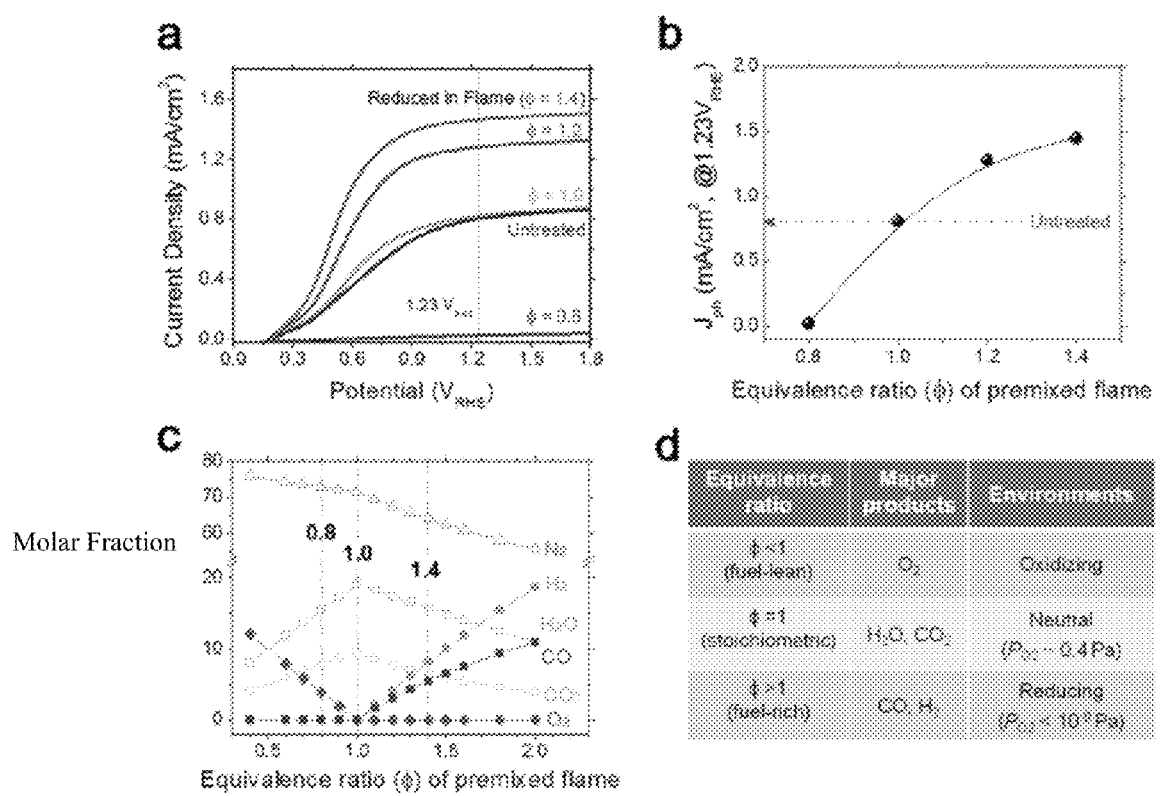
FIG. 23: Effect of the fuel-to-air equivalence ratio (Φ) on PEC water-splitting performance of the flame-reduced TiO$_2$ NWs. (a) J-V curves. (b) Photocurrent density values ($J_{ph}$, at 1.23 V$_{RHE}$) as a function of equivalence ratio. Flame reduction conditions: T=about 1000° C. and t=about 60 s. (c) Molar fraction of major gaseous combustion product as a function of equivalence ratio in the postflame region. (d) Effects of equivalence ratio on the flame annealing environments.

To focus on the effect of flame equivalence ratio, the flame annealing temperature and time of $TiO_2$ NWs are fixed at 1000° C. (about ±50° C. measurement error) and 60 s, respectively. FIG. 23a shows the PEC J-V curves of the $TiO_2$ NWs that are annealed under four different equivalence ratios: Φ=0.8, 1.0, 1.2 and 1.4, and the corresponding photocurrent density values at 1.23 $V_{RHE}$ ($J_{ph,1.23V}$) are plotted as a function of the equivalence ratio in FIG. 23b. After the stoichiometric flame annealing (Φ=1.0), the $TiO_2$ NWs exhibit nearly identical J-V curves and $J_{ph,1.23V}$ as those of the untreated $TiO_2$ NWs. The $TiO_2$ NWs annealed at the fuel-lean condition (Φ=about 0.8) exhibit adversely reduced $J_{ph,1.23V}$ (about 0.02 mA/cm2). On the other hand, the $TiO_2$ NWs annealed at fuel-rich conditions (Φ=about 1.2 and about 1.4) show significantly improved $J_{ph,1.23V}$.

To understand the effect of flame equivalence ratio on the $TiO_2$ PEC water-splitting performance (photocurrent density values), the gas-phase composition in the postflame region is calculated using the combustion equilibrium calculation code STANJAN (see the Methods section). FIG. 23c shows the equilibrium molar fractions of gaseous combustion product species in the postflame region as a function of equivalence ratio. The effect of flame equivalence ratio on the flame annealing environment is summarized in FIG. 23d. First, at the stoichiometric condition (Φ=1.0), mainly neutral (nonreactive) gases, such as $H_2O$ and $CO_2$, are present due to complete combustion reaction of $CH_4$/air, which leads to the identical J-V curve and $J_{ph,1.23V}$ for $TiO_2$ NWs after flame annealing. Second, at the fuel-lean condition (Φ<1.0), $O_2$ is a major product, and it removes the surface defects of the $TiO_2$ NW by oxidation. The removal of surface defect states hinders the water molecules adsorption process, so oxidized $TiO_2$ NWs have worsened PEC performance. Third, at fuel-rich conditions (Φ>1.0), reducing gases, $H_2$ and CO, are major combustion products due to the partial oxidation of $CH_4$ by air, and there is very little $O_2$ present. For example, the partial pressure of $O_2$ ($P_{O2}$) is about $1.0 \times 10^{-9}$ Pa (cf., $P_{CO}$=about 5.6 kPa and $P_{H2}$=about 8.3 kPa) for Φ=about 1.4. Hence, $H_2$ and CO effectively reduce the $TiO_2$ NWs by generating oxygen vacancies, leading to improved PEC water-splitting performance.

Figure 24:
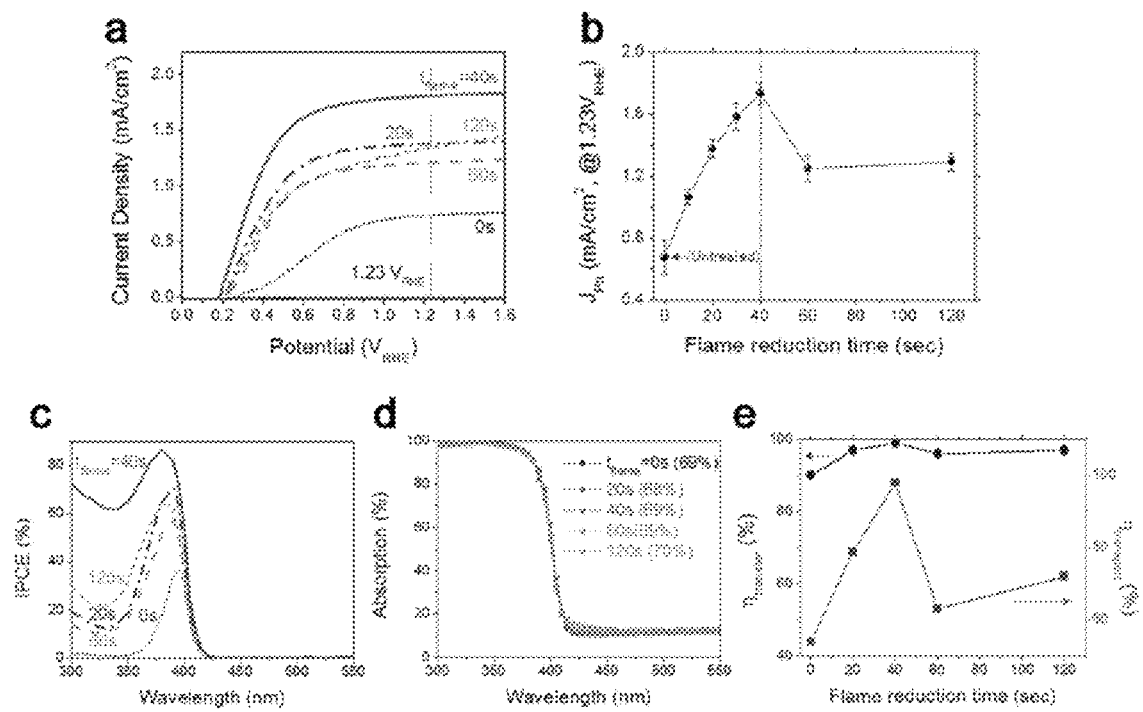
FIG. 24: Effect of flame reduction time on PEC water-splitting performance of the flame-reduced TiO$_2$ NWs and characterization of enhancing factors. (a) J-V curves. (b) Photocurrent density values (at 1.23 V$_{RHE}$) as a function of flame reduction time. The error bars represent the standard deviation of at least three samples. (c) IPCE spectra measured at 1.23 V$_{RHE}$. (d) Light absorption for which TiO$_2$ NWs grown on transparent quartz substrates are used. Even though the sample reduced for about 120 s shows a weak shoulder at 420-460 nm (i.e., sample color changed from white to light-yellow, FIG. 32c), all of the samples show comparable light absorption (about 68-70%) regardless of the flame reduction time. (e) Charge transfer and charge transport efficiencies (at 1.23 V$_{RHE}$) as functions of flame reduction time. Flame reduction conditions: T=about 1000° C., and Φ=about 1.4.

(2) Flame Reduction Time ($t_{flame}$). Next, the effect of flame reduction time on the $TiO_2$ PEC water-splitting performance is evaluated by fixing the flame temperature at 1000° C. and the equivalence ratio Φ at 1.4. FIG. 24a shows the representative PEC J-V curves of $TiO_2$ NWs reduced for different times (0, about 20, about 40, about 60, and about 120 s), and the corresponding photocurrent density values at 1.23 $V_{RHE}$ ($J_{ph,1.23V}$) are plotted as a function of the flame reduction time in FIG. 24b. For short flame reduction time up to about 40 s, the $J_{ph,1.23V}$ increases monotonically with increasing the reduction time. A flame reduction of about 40 s triples the $J_{ph,1.23V}$ from about 0.64 mA/cm² for the untreated $TiO_2$ NWs to about 1.74 mA/cm². For longer flame reduction time above about 40 s, the $J_{ph,1.23V}$ decreases to about 1.3 mA/cm2 for the $t_{flame}$=about 120 s sample, which is still about two times higher than that of the untreated sample. It should be noted that experiments with each flame treatment condition are repeated for three $TiO_2$ NW samples, and the corresponding J-V curves are highly reproducible with a standard deviation of about 8% (Supporting Information, Table 1).

To understand the effect of flame reduction time, the wavelength-dependent photocurrent responses are further compared by measuring the incident photon-to-current conversion efficiency (IPCE) for the $TiO_2$ NWs reduced for different time duration (FIG. 24c). First, all of the flame-reduced $TiO_2$ NWs exhibit higher IPCE values than that of the untreated $TiO_2$ NWs throughout the entire wavelength region below the band gap (about 420 nm). The IPCE values reach the maximum value of about 87% when $t_{flame}$=about 40 s. Second, the most prominent improvement of the IPCE values occurs in the shorter wavelength region (<350 nm) for all of the flame-reduced samples. The high energy photons in this shorter wavelength region have a small absorption depth (1/α) about a few tens of nanometers (Supporting Information, Table 2), so they are mainly absorbed by the surface layers of $TiO_2$ NWs, which are rich in oxygen vacancies (FIG. 22e). In other words, the prominent IPCE improvement in the ultraviolet region is closely related to the addition of oxygen vacancies near the top surface of $TiO_2$ NWs.

The IPCE of the $TiO_2$ NW photoanode is determined by the efficiencies of three fundamental processes involved in PEC water-splitting (see equation below), that is, charge generation efficiency ($\eta_{e-/h+}$), charge transport efficiency within the material ($\eta_{transport}$), and charge transfer (collection) efficiency at the electrode/electrolyte interface ($\eta_{transfer}$).

$$IPCE = \eta_{e-/h+} \times \eta_{transport} \times \eta_{transfer}$$

To identify factors responsible for the IPCE improvement in the flame-reduced $TiO_2$ NWs, the individual contributions of the above three factors are investigated separately. First, the light absorption spectra of the five $TiO_2$ NW samples with different reduction times are measured and compared over a wavelength range from 300 to 550 nm. As shown in FIG. 24d, all of the five samples show comparable light absorption (about 68 to about 70%) regardless of the flame reduction time, indicating that the flame reduction has little impact on the light absorption and the charge generation efficiency ($\eta_{e-/h+}$). Second, the charge transfer and transport efficiencies of the five $TiO_2$ NWs are decoupled and quantified by using $H_2O_2$ as a hole scavenger (see the Methods section and FIG. 30). As shown in FIG. 24e, for the charge transfer efficiency, all of the flame-reduced $TiO_2$ NWs show higher $\eta_{transfer}$ than the untreated sample, and especially the $t_{flame}$=about 40 s sample has the highest $\eta_{transfer}$ of nearly 100%. The observed improvement of $\eta_{transfer}$ for the flame-reduced $TiO_2$ NWs supports the notion that oxygen vacancies formation at the $TiO_2$ surface provides additional active sites for water molecules adsorption, thereby enhancing the charge transfer process for oxygen evolution reaction (OER). Nevertheless, the overall $\eta_{transfer}$ improvement is about 7-10%, which is not large enough to explain the much greater improvement of IPCE and $J_{ph,1.23V}$ with flame reduction. Third, the charge transport efficiency ($\eta_{transport}$) shows the greatest sensitivity toward the flame reduction time. The $TiO_2$ NW sample reduced for about 40 s has the highest $\eta_{transport}$ of about 98%, twice as high as that of the untreated sample (about 54%). This result indicates that the flame reduction significantly enhances the $\eta_{transport}$ and through which improves the PEC performance, which is consistent with the observation that the IPCE improvement mainly occurs at the shorter wavelength region.

Figure 25:
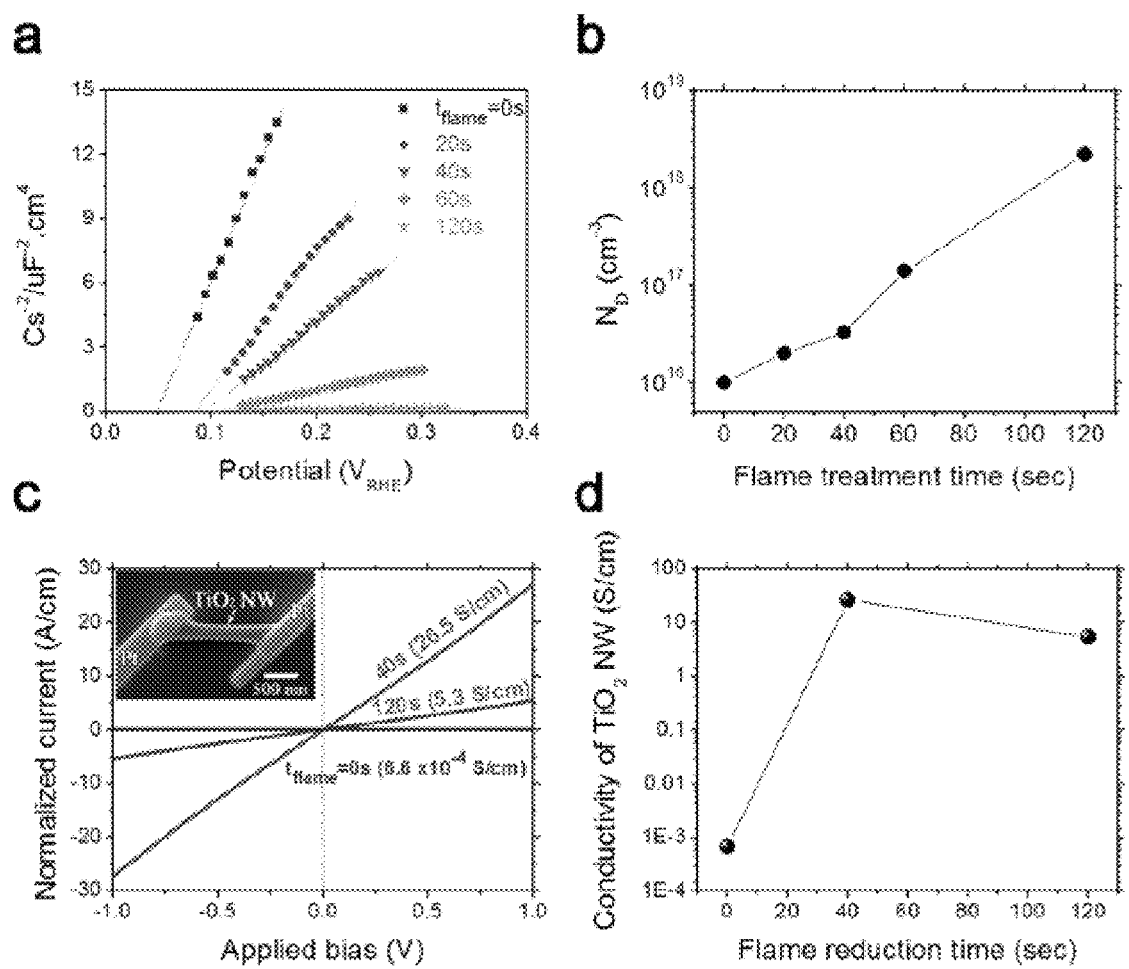
FIG. 25: Effects of flame reduction time on the electrical transport properties of TiO$_2$ NWs. (a) Mott-Schottky plots (collected at a frequency of 1 kHz) of TiO$_2$ NWs and (b) the corresponding donor density values. The surface area of NWs film is estimated by the NW coverage density and the average dimensions (length and width) of NWs. (c) Current-potential (I-V) curves of individual TiO$_2$ NWs (the inset shows an SEM image of a single TiO$_2$ NW with metal (Pt) contacts at both ends used for such measurement) and (d) the corresponding NW conductivity values.
Figure 32:
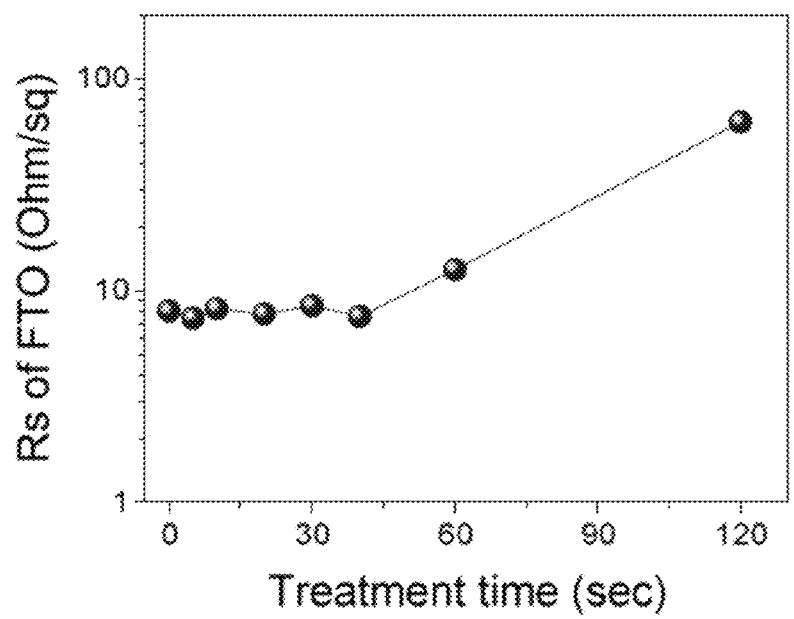
FIG. 32: Sheet resistance variation of the FTO substrate for which four point probe measurements are conducted. Flame reduction conditions: T=about 1000° C. and Φ=about 1.4

Next, to further understand this great improvement in the charge transport efficiency by flame reduction, the electron transport properties (e.g., donor density and conductivity) are further compared by measuring the electrochemical impedance and conductivity of individual $TiO_2$ NWs (FIG. 25). The charge carrier (donor) density values estimated from the Mott-Schottky plots (FIGS. 25a and b) show an exponential increase of donor density with increasing the flame reduction time. The electrical conductivities obtained by measuring individual $TiO_2$ NWs are about 0.0006, about 26.4, and about 5.3 S/cm for $t_{flame}$=0, about 40, and about 120 s, respectively (FIGS. 25c and d). The flame-reduced $TiO_2$ NWs have over 4 orders of magnitude higher conductivity than the untreated $TiO_2$ NW. These results indicate that flame reduction increases the donor concentration and hence improves the overall electron transport property. In addition, although the $t_{flame}$=about 120 s sample has higher donor density than that of the $t_{flame}$=about 40 s sample, its conductivity is about five times lower, indicating that longer flame reduction likely increases the bulk recombination and adversely affects the electron transport property. Finally, it should be noted that prolonged flame treatment will increase the sheet resistance of the FTO film (Supporting Information, FIG. 32), which also contributes to the lower $\eta_{transport}$ in the $t_{flame}$=about 120 s sample.

Figure 33:
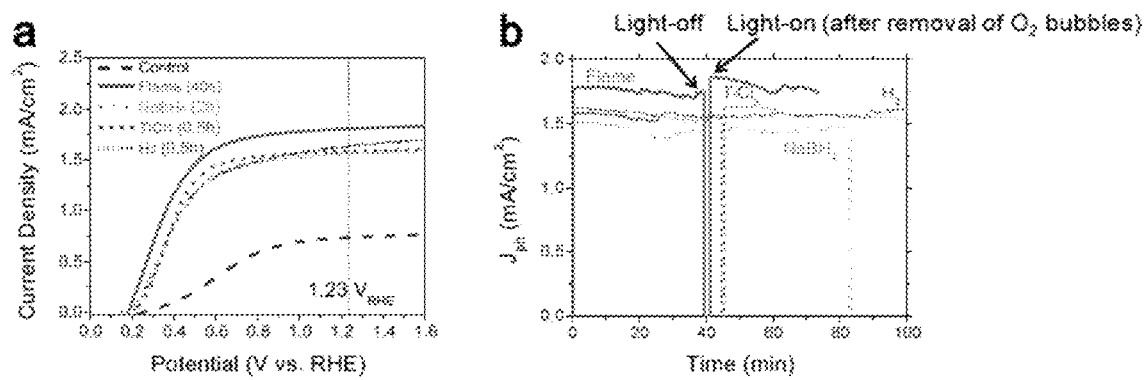
FIG. 33: Comparison of PEC water-splitting performances of flame-reduced $TiO_2$ NWs with those by other reduction methods. (a) J-V curves, and (b) Photocurrent stability (The noise in the lines are due to generated oxygen bubbles that are trapped on the surface of $TiO_2$ NWs).
Figure 34:
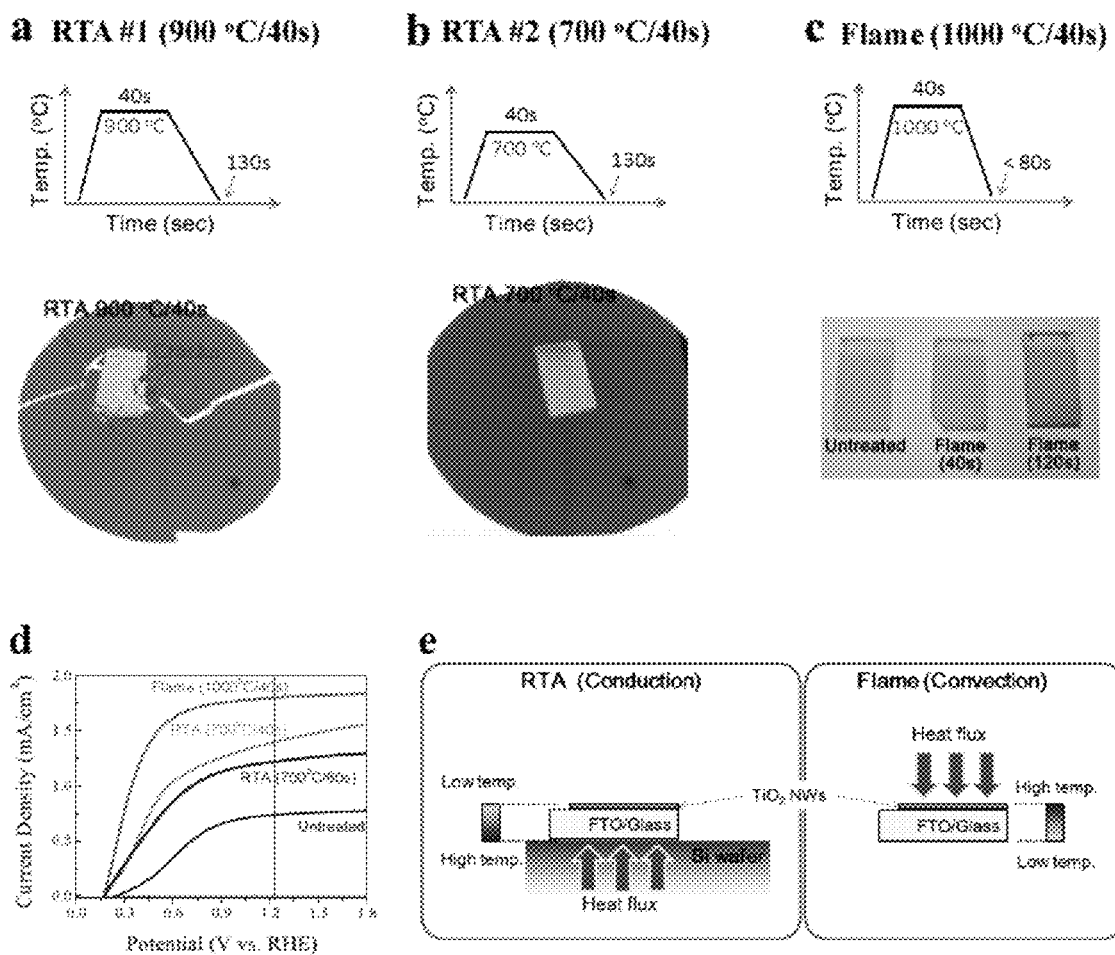
FIG. 34: Comparison of rapid thermal annealing (RTA) reduction (under a flow of $N_2/H_2$ forming gas) of $TiO_2$ NWs with flame reduction. Temperature profiles and photograph of samples (afterwards) for RTA reduction at (a) about 900° C./about 40 s and (b) about 700° C./about 40 s. The RTA_900° C./40 s sample and the underneath Si wafer are broken into pieces and FTO completely loses its conductivity. (c) Temperature profiles and photograph of samples (afterwards) for flame reduction at about 1000° C./about 40 s. (d) Comparison of the J-V curves of $TiO_2$ NWs samples reduced by the flame and RTA methods. Although the RTA_700° C./40 s $TiO_2$ NWs sample shows an improved photocurrent density (about 1.4 $mA/cm^2$ @1.23$V_{RHE}$), it is still much lower than that of the flame-reduced $TiO_2$ NWs sample (about 1.8 $mA/cm^2$ @1.23$V_{RHE}$), supporting that flame reduction is a more effective method. (e) Schematic illustration of different heating mechanism differences between RTA and flame. Although RTA provides a similar large heating rate (about 10-220° C./s) as that of flame (e.g., about 100° C./s) in a reducing environment, the heating mechanisms for $TiO_2$ NWs by flame and RTA are very different. In flame, the $TiO_2$ NWs are placed facing the flame, so they are directly heated by hot combustion gases through convection. The FTO/glass is heated by heat conduction from $TiO_2$ NWs, so it is at a lower temperature that protects the FTO/glass from damage. In RTA, the lamp mainly heats the Si wafer holder, which heats the TiO2 NWs through heat conduction from the FTO/ glass. Consequently, the FTO glass is at a higher temperature than the $TiO_2$ NWs, so the FTO/glass is easily damaged.

A comparison was made of the PEC water-splitting performance between a flame-reduced $TiO_2$ NWs (flame equivalence ratio=about 1.4, temperature=about 1000° C., and $t_{flame}$=about 40 s) and $TiO_2$ NWs reduced by other methods, that is, $H_2$ annealing, $NaBH_4$, and $TiCl_3$ solution methods. The flame-reduced $TiO_2$ NWs sample shows better PEC watersplitting performance (high photocurrent density and good photocurrent stability) (FIG. 33) than the $TiO_2$ NWs samples reduced by other methods. Additionally, a comparison is made of the flame reduction method with reduction in a rapid thermal annealing (RTA) system, which has a comparable large heating rate as with flame. Flame reduction is found to be a more effective method than RTA in reducing $TiO_2$ NWs for improving the PEC performance due to the heating mechanism differences between flame and RTA (FIG. 34). Of note, the flame reduction method involves the shortest treatment time (e.g., about 40 s instead of about 30 min) to obtain optimally reduced $TiO_2$ NWs, and it is scalable and can be readily implemented.

Figure 27:
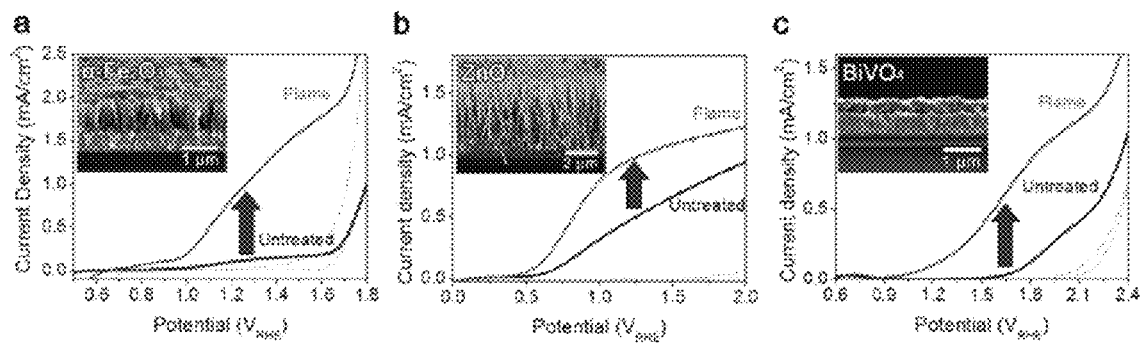
FIG. 27: Comparison of PEC J-V curves of other metal oxide photoanodes before/after flame reduction. (a) Hematite (α-Fe$_2$O$_3$) nanorods (about 1000° C., Φ=about 1.4 and about 5 min). (b) ZnO nanowires (about 1000° C., Φ=about 1.4, about 2 min). (c) BiVO$_4$ film (about 1000° C., Φ=about 1.4, about 2 min). Since the oxygen diffusion coefficients of α-Fe$_2$O$_3$ (about 10$^{-20}$ cm$^2$/s @ 1100° C.) and ZnO (about 10$^{-14}$ cm$^2$/s @ 1100° C.) are much smaller than that of rutile TiO$_2$ (about 10$^{-7}$ cm$^2$/s @ 1100° C.), a longer flame reduction time is used. The insets show cross-sectional SEM images of the corresponding samples after flame reduction, showing that there is little change in morphologies after flame reduction.

Versatility of the Flame Reduction Method: The flame reduction method has great versatility in application. The flame reduction process can be accomplished by many flame sources with proper control of the gas phase composition. In addition to the $CH_4$/air flat premixed flame used above, $CH_4$/$H_2$/air flat premixed flames and even premixed propane torch flames (FIG. 26, inset) can be used to effectively reduce $TiO_2$ NWs, leading to greatly enhanced PEC water-splitting performance (FIG. 26). Similar to the $CH_4$/air premixed flame, there is an optimal reduction time (or time range) for $TiO_2$ NWs to maximize the photocurrent density values ($J_{ph,1.23V}$) for both the $CH_4$/$H_2$/air premixed flame and propane torch flames (FIG. 26). The optimal reduction time decreases with increasing the flame temperature. Especially, in the case of the propane torch flame at a temperature of about 1300° C., about 5 s flame reduction increases the $J_{ph,1.23V}$ by more than twice. Finally, the flame reduction method can generate oxygen vacancies in diverse metal oxide materials, regardless of their preparation methods. To illustrate this, the similar flame reduction method with the premixed $CH_4$/air flame is applied to three metal oxide photoanodes: $\alpha$-$Fe_2O_3$ nanorods, ZnO NWs, and $BiVO_4$ film. As shown in FIG. 27, the PEC water-splitting performance, that is, both the photocurrent density values and the onset voltage values, of all three samples is significantly improved compared to the untreated samples (Supporting Information, Table 3). In particular, the flame reduction increases the photocurrent density of $\alpha$-$Fe_2O_3$ nanorods by over nine times.

In summary, this example reports a general flame reduction method to introduce a controllable and tunable amount of oxygen vacancies in $TiO_2$ NWs. Flame reduction significantly improves the PEC water-splitting performance of $TiO_2$ NWs because the generated oxygen vacancies greatly improve the charge transport efficiency by increasing the donor density and facilitate the charge transfer efficiency by providing additional active sites for water adsorption. Comparing to other reduction methods, the flame reduction method operates at ambient conditions and is rapid (e.g., less than a minute) and effective. Even about 5 s reduction by a propane torch flame can double the photocurrent density of $TiO_2$ NWs for the PEC water-splitting application. Flame reduction of $\alpha$-$Fe_2O_3$ nanorods, ZnO NWs, and $BiVO_4$ film also leads to significantly improved PEC performance. It is contemplated that the flame reduction method can be a general and cost-effective way to generate oxygen vacancies in oxide materials, impacting many applications.

Experimental Methods

Synthesis of Rutile $TiO_2$ NWs: The pristine $TiO_2$ NW arrays with an average length of about 3.0 µm were synthesized on $TiO_2$ nanoparticles coated-FTO (fluorine-doped tin oxide, TEC-8, Pilkington) substrates using the hydrothermal method. Briefly, about 0.6 mL of titanium(IV) butoxide (Aldrich Chemicals, 97%) was added into about 50 mL of an aqueous HCl solution (about 25 mL of deionized (DI) water+ about 25 mL of concentrated HCl (38%)) under magnetic stirring. After stirring for another about 5 min, the solution was poured into a Teflon-lined stainless steel autoclave (100 mL capacity), and pieces of the $TiO_2$ nanoparticles coated-FTO substrates were immersed in the solution. The autoclave was sealed and heated to about 170° C. in an oven and held at about 170° C. for about 7 h. The autoclave was then removed from the oven and cooled down to room temperature naturally. The FTO substrates with the top obtained products were washed with DI water and annealed at about 500° C. for about 1 h in air.

Flame Reduction Experiments: The flame reduction experiment was conducted using an about 6 cm diameter coflow premixed flat flame burner (McKenna Burner), which operates on a premixture gas of $CH_4$ (fuel) and air (oxidizer). The flat premixed flame configuration (FIG. 22b) provides a spatially uniform environment in terms of temperature and gas phase species compositions. The flow rates of $CH_4$ and air were about 2.05 and about 13.3 SLPM, respectively, yielding an overall fuel-to-oxygen equivalence ratio ($\Phi$) of about 1.4. The flow rates were varied to achieve other equivalence ratios. The as-synthesized $TiO_2$ NWs were annealed in the postflame region with a local gas phase temperature of about 1000° C. for about 5-120 s. Two other flame sources, that is, the $CH_4$/$H_2$/air flame and propane torch (model: TS4000T, Bernz-O-Matic), were also used to reduce the $TiO_2$ NWs. The $CH_4$/$H_2$/air premixed flame ($\Phi$=about 1.4) was also achieved with the McKenna burner, and the flow rates of $CH_4$, $H_2$, and air were about 2.05, about 4.64, and about 27.5 SLPM, respectively. For the propane torch reduction, the distance between the sample and nozzle was fixed to about 5 cm so that the sample is located at a high-temperature region with reducing gas environment. The gas composition in the postflame region was calculated with the combustion equilibrium calculation code STANJAN. It was specified that the reactants are at about 25° C. and about 1 atm, and the combustion products are at about 1000° C. and about 1 atm and have reached equilibrium.

Material Characterization: The morphologies of as-synthesized and flame-reduced $TiO_2$ NWs were investigated using scanning electron microscopy (SEM, FEI XL30, Sirion). The crystallinity and oxygen vacancies distribution were investigated using a transmission electron microscope (ETEM, FEI Titan 80-300, 300 kV) equipped with an energy dispersive X-ray spectrometer (EDS) and an electron energy loss spectrometer (EELS) (see Supporting Information for details). For the optical measurements, $TiO_2$ NWs were grown on quartz substrates (3 cm×3 cm) using identical growth conditions. The wavelength-dependent optical absorption properties were obtained with an integrating sphere using a xenon lamp coupled to a monochromator (model QEX7, PV Measurements, Inc.).

Photoelectrochemical Measurements: The photoelectrochemical performance of as-synthesized and flame-reduced $TiO_2$ NWs was measured with a potentiostat (model SP-200, BioLogic) in a three-electrode configuration (a saturated calomel reference electrode (SCE), $TiO_2$ working electrode, and a Pt wire counter electrode) under illumination of simulated solar light (AM 1.5 G, 100 mW/cm²) using a solar simulator (model 94306A, class AAA, Oriel). Before measurement, the solar simulator intensity was calibrated with a reference silicon solar cell and a readout meter for solar simulator irradiance (model 91150 V, Newport). The illuminated area of the working $TiO_2$ electrode was about 0.63 cm² defined by a mask. For $TiO_2$ and $\alpha$-$Fe_2O_3$ electrodes, about 1 M KOH or about 1 M KOH with about 0.5 M $H_2O_2$ solution was used as the electrolyte. For ZnO and $BiVO_4$ electrodes, about 0.5 M of about pH 7 phosphate buffer solution was used as the electrolyte. During the PEC measurement, the electrolyte was deaerated by argon purging to remove the dissolved oxygen. For a typical J-V measurement, the voltage was swept linearly from $-1.0$ to $2.0 V_{SCE}$ at a scan rate of about 50 mV/s. The electrochemical impedance spectroscopy (EIS) measurements were performed in the same three-electrode configuration with the same potentiostat but under dark conditions. The amplitude of the sinusoidal voltage was 10 mV, and the frequency range examined was from 100 kHz to 1 Hz. For the Mott-Schottky analysis, the capacitance values were derived from the EIS measurement, and charge carrier density values were estimated using data sets at 1 kHz. The incident photon-to-current conversion efficiency (IPCE) was measured at 1.23 VRHE (about 0.2 VSCE) using a specially designed IPCE system for solar cell (QEX7, PV measurements), with the three-electrode configuration. A 75 W Xe lamp equipped with a monochromator (CM-110, ⅛, SP Spectra Product) was used to generate a monochromatic beam. The incident light intensity was calibrated by a standard silicon photodiode. The charge transport and transfer efficiencies were estimated as functions of applied potential by using $H_2O_2$ as a hole scavenger under AM1.5 G simulated solar light illumination. The key assumption for this approach is that the oxidation kinetics of $H_2O_2$ is very fast, and its charge transfer efficiency is 100%, so the ratio of photocurrent density measured in $H_2O$ and $H_2O_2$ gives the charge transfer efficiency ($\eta_{transfer}$) for $H_2O$ (see equation below). The charge transport efficiency ($\eta_{transport}$) was further calculated by dividing photocurrent density in $H_2O_2$ by the total light absorption efficiency ($\eta_{e-/h+}$), which is obtained from integration of the light absorption (FIG. 22d) with respect to the AM1.5 G solar light spectrum (see equation below).

$$\eta_{transfer} = \frac{J_{ph,H_2O}}{J_{ph,H_2O_2}}$$

$$\eta_{transport} = \frac{J_{ph,H_2O_2}}{\eta_{e-/h+}}$$

Supporting Information

Synthesis of Metal Oxide Photoanode Materials

Synthesis of $\alpha$-$Fe_2O_3$ nanorods (NRs): First, the FeOOH NRs arrays with an average length about 600 nm were grown on FTO (fluorine-doped tin oxide, TEC-8, Pilkington) substrates using the hydrothermal method with slight modifications. Briefly, about 10 mmol of $FeCl_3.6H_2O$ (Sigma-Aldrich Chemicals, >98%) and about 15 mmol of urea (Sigma, 98%) were dissolved in about 100 ml of DI water in a Pyrex glass bottle (120 ml capacity) by magnetic stirring, and then four pieces of pre-cleaned FTO substrates (1.5 cm×3.0 cm) were immersed and suspended vertically by using Teflon wires. The glass bottle was then heated to about 100° C. in an oven and held at about 100° C. for about 6 h. After the growth, the obtained products were thoroughly washed with DI water and finally annealed at about 550° C. for about 2 h to obtain the $\alpha$-$Fe_2O_3$ NRs.

Synthesis of ZnO nanowires (NWs): ZnO NWs with an average length about 4 µm were synthesized on ZnO nanoparticles-coated FTO substrates using the hydrothermal method with slight modifications. First, the seed nanoparticles coating was prepared by dissolving about 5 mmol of zinc acetate dihydrate (Aldrich Chemicals, 99.99%) in ethanol (about 10 ml, 99.9%). The solution was spin-coated (3000 rpm, 60 s) on pre-cleaned FTO substrates (1.5 cm×2.5 cm) and then annealed at about 400° C. for about 1 h in air. Next, for the aqueous growth solution, zinc nitrate hexa-hydrate (about 5 mmol, Sigma-Aldrich Chemicals, >99.0%) and hexamethylenetetramine (about 5 mmol, Sigma-Aldrich Chemicals, >99%) were dissolved in about 100 ml of DI water in a Pyrex glass bottle (120 ml capacity). After about 10 min stirring, two pieces of the ZnO nanoparticles-coated FTO substrates were immersed and suspended vertically by using Teflon wires inside the glass bottle, and kept at about 95° C. for about 10 h. After the reaction, the obtained products were thoroughly washed with DI water and finally annealed at about 500° C. for about 2 h in air.

Synthesis of $BiVO_4$ film: The $BiVO_4$ film was prepared by a modified metal-organic decomposition (MOD) method with slight modifications. Briefly, about 1.5 mmol of $Bi(NO_3)_3.5H_2O$ (Sigma-Aldrich Chemicals, >98%) and vanadyl acetylacetonate (Aldrich Chemicals, 98%) were dissolved in a mixture solution of acetic acid (about 2 ml, EMD Chemicals, 99.7%), 2-methooxyethanol (about 7 ml, Acros Organics, 99.5%) and acetylacetone (about 1 ml, Sigma-Aldrich Chemicals, >99%). After complete dissolution by about 10 min sonication, the solution (about 0.15M) was spin-coated on pre-cleaned FTO substrate. To obtain about 300 nm thickness, the spin-coating procedure (3000 rpm, 60 s) was repeated 6 times using an intermediate annealing (about 350° C., about 10 min) on a hot-plate. Finally, the film was annealed at about 550° C. for about 1 h in air.

Other Reduction Methods $TiCl_3$ solution reduction: The as-synthesized $TiO_2$ NWs was immerged in a Pyrex glass bottle (20 ml) with an aqueous solution of DI water (about 10 ml), HCl (about 0.01 ml), and $TiCl_3$ solution (about 0.05 ml, Fisher Scientific, about 20 wt % of $TiCl_3$ in $H_2O$ and HCl solution), and then kept at about 80° C. for about 5-30 min in an oven. The $TiO_2$ NWs are reduced by electrons that are generated from the hydrolysis and oxidation of $Ti^{3+}$ ions in the solution (see equation below).

$$Ti^{3+}+2H_2O \rightarrow TiO_2+e^-+4H^+$$

$NaBH_4$ solution reduction: The as-synthesized $TiO_2$ NWs were immersed in a Pyrex glass bottle (20 ml) with an aqueous $NaBH_4$ solution (about 0.2 M) and then kept at about 80° C. for about 2 h in an oven. Since the reduction process produces $H_2$ gas, the cap of the bottle should be opened slightly for safety reasons. The $TiO_2$ NWs are reduced by electrons that are generated from the hydrolysis and oxidation of $BH^{4-}$ ions in the solution (see equation below).

$$NaBH_4+8OH^- \rightarrow NaBO_2+8e^-+6H_2O$$

$H_2$ reduction: The as-synthesized $TiO_2$ NWs were annealed in a tube furnace at about 500° C. for about 30-60 min under a flow of mixture gas (about 30 sccm $H_2$ and about 70 sccm Argon).

Rapid thermal annealing (RTA) reduction: A $N_2/H_2$ forming gas is used as a reducing gas for the RTA reduction process (All Win 610, AllWin21 Corp.). Before experiments, gas flowing sequences, heating rate and real temperature profile were calibrated to match the pre-programmed recipe. During the reduction experiment, the as-synthesized $TiO_2$ NWs were put in the middle of the supporting Si wafer (4 inches) that was heated with a pre-programmed temperature profile.

TEM characterizations: Cross-sectional TEM samples were prepared by embedding $TiO_2$ NWs in polyimide or epoxy resin on quartz substrates. Both sides of the samples were mechanically polished to reach a thickness about 50 μm. The samples were further thinned down by ion milling with the Gatans precision ion polishing system (PIPS) for TEM transparency. TEM imaging, EDS mapping and EEL spectra acquisition were performed in a FEI Titan Scanning Transmission Electron Microscope (STEM) operated at 300 kV and equipped with a Cs image corrector and a monochromator. TEM images were taken using an Ultrascan 1000 CCD camera at binning 2 (1024×1024 pixels) with an exposure time of 0.5 s per image. The EELS were acquired in the monochromated STEM imaging mode, using a Gatan Tridiem 866 EEL spectrometer with a 2.5 mm entrance aperture. The dispersion setting was 0.2 eV/pixel, and the energy resolution for these experiments (specified by the FWHM of the zero loss peak) was 0.16 eV. An aperture size of 50 μm for the third condenser lens system, a camera length of 38 mm and a 2.5 mm spectrometer entrance aperture were used during the EEL spectra acquisition, resulting in convergence and collection semi-angles of 8.7 mrad and 25.1 mrad, respectively. The spectra of the sample region of interest were acquired in Titan imaging and Analysis (TIA) software. Each spectra were collected every 3 nm in radial direction across the NWs. Elemental maps were derived from EELS spectrum images, where the EELS spectra were acquired from each pixel (3 nm×3 nm). During the experiment, the incident electron beam was perpendicular to the NW. The EELs data were post-processed in Digital micrograph. The background of the spectra was subtracted using the power-law model. The spectrum processing for elemental quantification of the Titanium and oxygen across the cross-sectional NW was carried out in Digital Micrograph EELS analysis via Hatree-Slater for Ti L edges and Hydrogenic cross-sections for the Oxygen K edge.

Single NW conductivity measurement: The as-synthesized and flame-reduced $TiO_2$ NWs grown on quartz substrates were sonicated in isopropanol (IPA) solution and then drop-casted onto a $SiO_2$/Si substrate. Platinum (Pt) metal contacts were deposited on both ends of individual $TiO_2$ NWs by using the focused-ion beam (FIB, FEI Strata DB235). Current-voltage (J-V) curves were measured under the dark condition at room temperature using a semiconductor analyzer (Model 4200-SCS, Keithley) with tungsten probes.

Statistical Data on Photocurrent Density Values of the Flame-reduced $TiO_2$ NWs Photoanodes (Φ=about 1.4, about 1000° C.) at 1.23 $V_{RHE}$:

TABLE 1

| | Photocurrent density value at 1.23 $V_{RHE}$ | | | | | |
|---|---|---|---|---|---|---|
| | Sample #1 | Sample #2 | Sample #3 | Sample #4 | Average | STD |
| As-synthesized (untreated) | 0.59 | 0.562 | 0.737 | 0.80 | 0.673 | 0.115 |
| $t_{name}$ = 30 sec | 1.51 | 1.56 | 1.77 | — | 1.583 | 0.087 |
| $t_{name}$ = 40 sec | 1.72 | 1.67 | 1.81 | — | 1.733 | 0.071 |
| $t_{name}$ = 60 sec | 1.19 | 1.21 | 1.35 | — | 1.25 | 0.087 |
| $t_{name}$ = 120 sec | 1.34 | 1.23 | 1.31 | — | 1.293 | 0.057 |

Light Absorption Depth (1/α) of Rutile $TiO_2$ Film:

TABLE 2

| Wavelength (nm) | 300 | 320 | 340 | 360 | 380 | 400 | 420 |
|---|---|---|---|---|---|---|---|
| Depth (nm) | 10 | 20 | 52 | 180 | 1,200 | 1,800 | 900,000 |

Summary of Onset Voltage Values of $TiO_2$ (Rutile), α-$Fe_2O_3$, ZnO and $BiVO_4$ Photoanodes:

TABLE 3

| | $V_{onset}$ (Ours, V vs. RHE) | | $V_{onset}$ (literature, V vs. RHE) |
|---|---|---|---|
| | Before | After | |
| $TiO_2$ (Rutile) | 0.25 | 0.18 | 0.1-0.3[5-7] |
| α-$Fe_2O_3$ | 0.82 | 0.75 | 0.8-1.1[8,9] |
| ZnO | 0.42 | 0.35 | 0.3-0.5[10,11] |
| $BiVO_4$ | 1.12 | 0.84 | 0.3-0.6[12,13] |

For all the oxides investigated ($TiO_2$, $Fe_2O_3$, ZnO and $BiVO_4$), the $V_{onset}$ values are reduced after the flame reduction. The reduction of $V_{onset}$ is due to the formation of oxygen vacancies near the surface, which improves the electron transport and reduces surface recombination. Second, both flame-reduced $Fe_2O_3$ and ZnO show comparable $V_{onset}$ values with those of literature values. Third, the investigated $BiVO_4$ film shows a higher $V_{onset}$ than typically reported values for $BiVO_4$ because the synthesis of the investigated $BiVO_4$ photoanode before the flame reduction is not optimized in this example. As shown in the cross-sectional SEM image (FIG. 27c, inset), the BiVO4 photoanode has poor-contact with the FTO substrate because of the un-optimized synthesis method of this example. Both low quality film and poor contact can lead to higher $V_{onset}$ values. Nevertheless, the $BiVO_4$ results still support that flame reduction can improve the PEC performance of metal oxide photoanodes.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations is not a limitation of this disclosure.

What is claimed is:
1. A sol-flame method, comprising:
    forming a sol-gel precursor solution of a source of a dopant;
    coating a nanostructure or a thin film with the sol-gel precursor solution; and
    subjecting the coated nanostructure or the coated thin film to flame annealing to form a doped nanostructure or a doped thin film,
    wherein a concentration of the dopant at a surface of the doped nanostructure or the doped thin film is at least 5 at.

%, and a concentration of the dopant at a depth of 10 nm below the surface is at least 50% of the concentration of the dopant at the surface.

2. The sol-flame method of claim 1, wherein the dopant is a metal or a metalloid.

3. The sol-flame method of claim 1, wherein the sol-gel precursor solution includes a salt of the dopant at a concentration in the range of 0.01 M to 0.2 M.

4. The sol-flame method of claim 1, wherein coating with the sol-gel precursor solution is carried out by dip-coating or spin-coating.

5. The sol-flame method of claim 1, wherein flame annealing is carried out at a temperature in the range of 900° C. to 1400° C.

6. The sol-flame method of claim 1, wherein flame annealing is carried out for a duration in the range of 5 s to 5 min.

7. The sol-flame method of claim 1, wherein flame annealing is carried out at a heating rate of at least 50° C./s.

8. The sol-flame method of claim 1, wherein flame annealing is carried out at a fuel-to-oxidizer equivalence ratio up to 1.1.

9. The sol-flame method of claim 1, wherein flame annealing is carried out at a fuel-to-oxidizer equivalence ratio up to 1.

10. The sol-flame method of claim 1, wherein the dopant is a first dopant, and further comprising annealing the doped nanostructure or the doped thin film in the presence of a gaseous source of a second dopant to form a codoped nanostructure or a codoped thin film.

11. The sol-flame method of claim 1, wherein the dopant is a first dopant, the sol-gel precursor solution includes a source of a second dopant, and flame annealing is carried out to form a codoped nanostructure or a codoped thin film.

12. A flame reduction method, comprising:
providing a nanostructure or a thin film; and
subjecting the nanostructure or the thin film to flame annealing to introduce oxygen vacancies in the nanostructure or the thin film wherein the reactivity of the nanostructure or the thin film is increased,
wherein flame annealing is carried out at a temperature of at least 900° C., and a fuel-to-oxidizer equivalence ratio that is greater than 1.

13. The flame reduction method of claim 12, wherein flame annealing is carried out at the temperature of at least 900° C. for a duration in the range of 5 s to 5 min.

14. The flame reduction method of claim 12, wherein the fuel-to-oxidizer equivalence ratio is greater than 1 and is up to 1.5.

15. The flame reduction method of claim 12, wherein flame annealing is carried out with a partial pressure of $O_2$ that is less than 0.4 Pa.

16. The flame reduction method of claim 12, wherein the nanostructure or the thin film includes a metal oxide, and an oxygen-to-metal molar ratio at a surface of the nanostructure or the thin film subsequent to flame annealing is no greater than 80% of an initial oxygen-to-metal molar ratio at the surface prior to flame annealing.

* * * * *